(12) United States Patent
Doi et al.

(10) Patent No.: US 11,115,564 B2
(45) Date of Patent: Sep. 7, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Tsukasa Doi, Tokyo (JP); Hiromitsu Yamaguchi, Yokohama (JP); Akitoshi Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 16/842,824

(22) Filed: Apr. 8, 2020

(65) Prior Publication Data

US 2020/0329175 A1 Oct. 15, 2020

(30) Foreign Application Priority Data

Apr. 15, 2019 (JP) .............................. JP2019-077284

(51) Int. Cl.
*H04N 1/60* (2006.01)
*B41J 2/21* (2006.01)

(52) U.S. Cl.
CPC .......... *H04N 1/6097* (2013.01); *B41J 2/2103* (2013.01); *H04N 1/6075* (2013.01)

(58) Field of Classification Search
CPC ...... H04N 1/6097; H04N 1/6075; H04N 1/54; B41J 2/2103; B41J 2/21
See application file for complete search history.

(56) References Cited

U.S. PATENT DOCUMENTS

| | | |
|---|---|---|
| 5,847,719 A | 12/1998 | Yamaguchi et al. |
| 5,847,723 A | 12/1998 | Akahira et al. |
| 5,864,349 A | 1/1999 | Hirabayashi et al. |
| 5,877,783 A | 3/1999 | Iwasaki et al. |
| 5,971,525 A | 10/1999 | Inoue et al. |
| 5,980,012 A | 11/1999 | Fujita et al. |
| 6,000,781 A | 12/1999 | Akiyama et al. |
| 6,312,095 B1 | 11/2001 | Hiramatsu et al. |

(Continued)

FOREIGN PATENT DOCUMENTS

JP 2016-055463 A 4/2016

OTHER PUBLICATIONS

U.S. Appl. No. 16/868,259, filed Apr. 2, 2020.
U.S. Appl. No. 16/842,823, filed Apr. 8, 2020.

*Primary Examiner* — Christopher Wait
(74) *Attorney, Agent, or Firm* — Venable LLP

(57) ABSTRACT

Provided is an image processing apparatus including a generating unit configured to print data to be used in a process of printing a metallic image using a metallic ink containing silver particles in an inkjet printing apparatus capable of ejecting the metallic ink and at least one type of chromatic color ink; and an obtaining unit configured to obtain metallic image data corresponding to a predetermined region on a print medium and indicating a tone in the metallic image. The generation unit generates print data of the metallic ink to be printed in the predetermined region based on the metallic image data and generates print data of the chromatic color ink to be printed in the predetermined region based on the metallic image data obtained by the obtaining unit and pre-stored data indicating the correspondences between tone values of the metallic image data and amounts of the chromatic color ink.

20 Claims, 18 Drawing Sheets

(56) References Cited

U.S. PATENT DOCUMENTS

| | | |
|---|---|---|
| 6,325,479 B1 | 12/2001 | Nakamura et al. |
| 6,540,346 B1 | 4/2003 | Akahira et al. |
| 6,612,678 B2 | 9/2003 | Kato et al. |
| 6,860,578 B2 | 3/2005 | Yamada et al. |
| 6,877,835 B2 | 4/2005 | Kato et al. |
| 7,125,095 B2 | 10/2006 | Yamada et al. |
| 7,237,871 B2 | 7/2007 | Yamaguchi et al. |
| 7,278,700 B2 | 10/2007 | Yamaguchi et al. |
| 7,296,868 B2 | 11/2007 | Shibata et al. |
| 7,360,856 B2 | 4/2008 | Ochiai et al. |
| 7,431,426 B2 | 10/2008 | Yamaguchi et al. |
| 7,585,040 B2 | 9/2009 | Ochiai et al. |
| 7,726,767 B2 | 6/2010 | Noguchi et al. |
| 7,773,244 B2 | 8/2010 | Yano et al. |
| 7,837,283 B2 | 11/2010 | Goto et al. |
| 7,880,910 B2 | 2/2011 | Aichi et al. |
| 7,959,259 B2 | 6/2011 | Yamaguchi et al. |
| 7,961,345 B2 | 6/2011 | Yano et al. |
| 8,018,621 B2 | 9/2011 | Marumoto et al. |
| 8,174,711 B2 | 5/2012 | Yano et al. |
| 8,184,339 B2 | 5/2012 | Marumoto et al. |
| 8,203,741 B2 | 6/2012 | Yano et al. |
| 8,210,638 B2 | 7/2012 | Wada et al. |
| 8,287,074 B2 | 10/2012 | Kano et al. |
| 8,395,802 B2 | 3/2013 | Yano et al. |
| 8,430,472 B2 | 4/2013 | Nishikori et al. |
| 8,711,453 B2 | 4/2014 | Yamada et al. |
| 8,743,420 B2 | 6/2014 | Ishikawa et al. |
| 8,896,883 B2 | 11/2014 | Goto et al. |
| 8,896,884 B2 | 11/2014 | Yamada et al. |
| 8,911,048 B2 | 12/2014 | Yamada et al. |
| 8,936,341 B2 | 1/2015 | Kagawa et al. |
| 8,960,834 B2 | 2/2015 | Goto et al. |
| 9,007,655 B2 | 4/2015 | Iguchi et al. |
| 9,030,712 B2 | 5/2015 | Saito et al. |
| 9,044,947 B2 | 6/2015 | Wada et al. |
| 9,073,341 B2 | 7/2015 | Yamada et al. |
| 9,195,917 B2 | 11/2015 | Nakagawa et al. |
| 9,389,824 B2 | 7/2016 | Yano et al. |
| 10,071,569 B2 | 9/2018 | Ochi et al. |
| 2003/0222985 A1 | 12/2003 | Goto et al. |
| 2011/0019208 A1 | 1/2011 | Yamaguchi et al. |
| 2017/0282540 A1* | 10/2017 | Ochi ................ B41J 2/15 |

* cited by examiner

LANDED

PERMEATED

FUSED

Me DOT DATA → VALUE TO BE ADDED OF Me' AT EACH PIXEL → REGION COLOR ADJUSTMENT INTENSITY Me'

Me DOT DATA → VALUE TO BE ADDED OF Me' AT EACH PIXEL → REGION COLOR ADJUSTMENT INTENSITY Me'

Me DOT DATA → VALUE TO BE ADDED OF Me' AT EACH PIXEL → REGION COLOR ADJUSTMENT INTENSITY Me'

Me DOT DATA → VALUE TO BE ADDED OF Me' AT EACH PIXEL → REGION COLOR ADJUSTMENT INTENSITY Me'

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

In recent years, metallic inks have been developed which contain metallic particles and are printable on a print medium by an inkjet printing apparatus or the like. Using a metallic ink can impart metallic gloss to a printed product. Japanese Patent Laid-Open No. 2016-55463 discloses a printing apparatus using a metallic ink containing silver particles.

In a liquid state, a metallic ink containing silver particles appears brownish due to localized surface plasmon resonance. In a case where a print medium is printed by an inkjet method using such an ink, the outer peripheries of metallic dots have a low density of silver particles and the fusion of the silver is therefore insufficient. This leaves the above-mentioned brownishness. Consequently, whole regions printed with the metallic ink containing silver particles may appear colored brownish.

SUMMARY OF THE INVENTION

An image processing apparatus according to an aspect of the present invention is an image processing apparatus comprising: a generating unit configured to generate print data to be used in printing a metallic image using a metallic ink containing silver particles in an inkjet printing apparatus capable of ejecting the metallic ink and at least one type of chromatic color ink; and an obtaining unit configured to obtain metallic image data corresponding to a predetermined region on a print medium and indicating a tone in the metallic image, wherein the generation unit generates print data of the metallic ink to be printed in the predetermined region based on the metallic image data obtained by the obtaining unit and generates print data of the chromatic color ink to be printed in the predetermined region based on the metallic image data obtained by the obtaining unit and pre-stored data indicating correspondences between tone values of the metallic image data and amounts of the chromatic color ink.

Further features of the present invention will become apparent from the following description of exemplary embodiments with reference to the attached drawings.

DESCRIPTION OF THE EMBODIMENTS

Embodiments of the present invention will be described below with reference to the drawings. It should be noted that the following embodiments do not limit the present invention and that not all of the combinations of the features described in the present embodiments are necessarily essential for solving the problem to be solved by the present invention. Meanwhile, the description will be given with the same reference sign given to identical components. Also, relative positions, shapes, and the like of the constituent elements described in the embodiments are exemplary only and are not intended to limit the scope of the invention only to those.

<Printing System>

Figure 1:
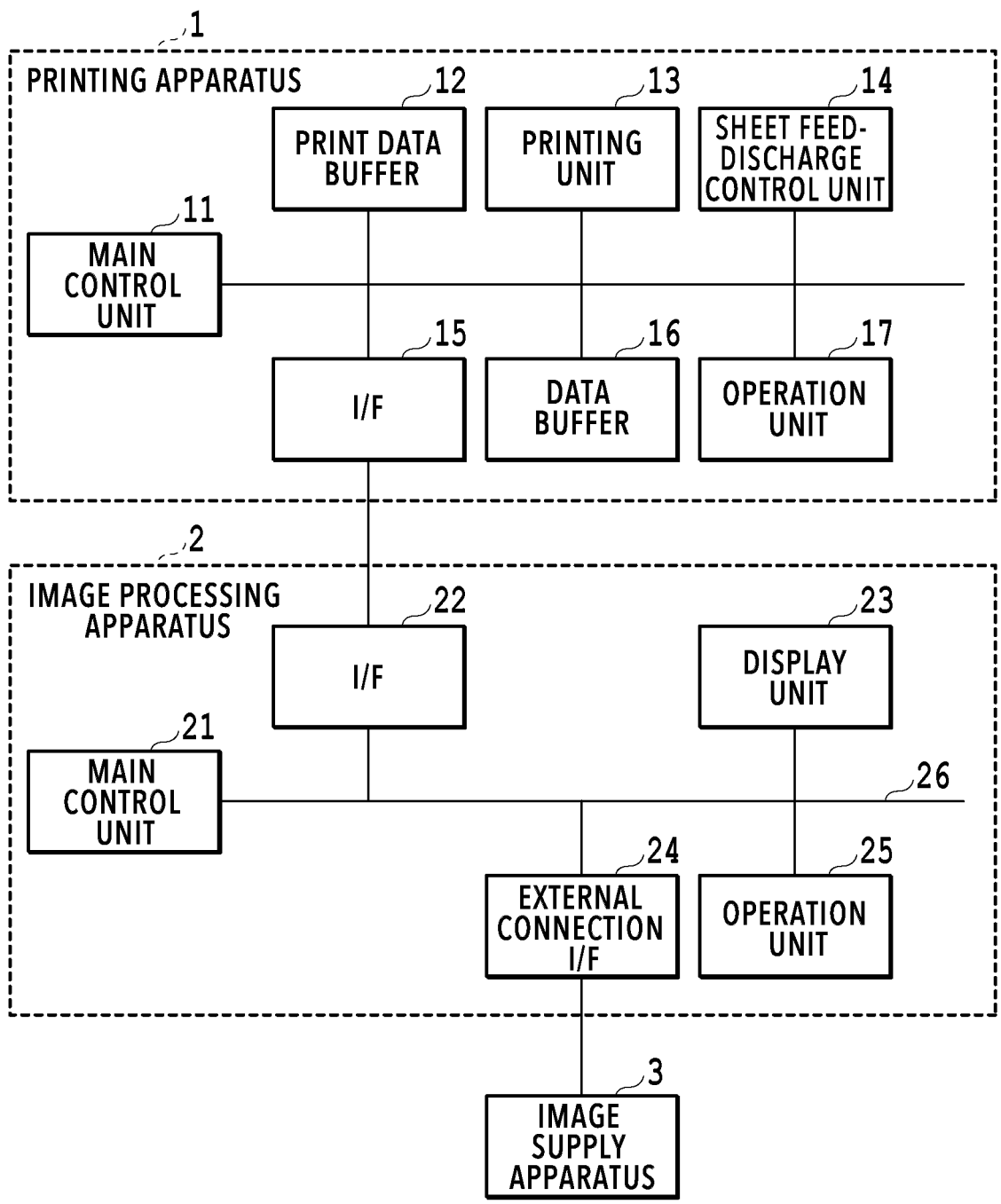
FIG. 1 is a block diagram showing a configuration of a printing system.

FIG. 1 is a diagram showing an example of a printing system in an embodiment. The printing system has an inkjet printing apparatus (hereinafter also referred to simply as the printing apparatus) 1, an image processing apparatus 2, and an image supply apparatus 3. The image supply apparatus 3 supplies image data to the image processing apparatus 2. The image processing apparatus 2 generates print data by performing predetermined image processing on the image data supplied from the image supply apparatus 3, and transmits the generated print data to the printing apparatus 1. The printing apparatus 1 prints an image on a print medium with inks based on the print data transmitted from the image processing apparatus 2.

A main control unit 11 of the printing apparatus 1 includes a CPU, a ROM, a RAM, and the like and takes overall control of the entire apparatus 1. In an example, the CPU of the main control unit 11 executes a later-described process shown in FIG. 8. A data buffer 16 temporarily stores image data received from the image processing apparatus 2 through an interface (I/F) 15. A print data buffer 12 temporarily stores print data to be transferred to a printing unit 13 in the form of raster data. An operation unit 17 is a mechanism with which the user performs command operations, and a touchscreen and operation buttons or the like can be used. A sheet feed-discharge control unit 14 controls the feed and discharge of print media.

The printing unit 13 includes an inkjet print head, and this print head has a plurality of nozzle arrays each formed of a plurality of nozzles capable of ejecting ink droplets. The printing unit 13 prints an image on a print medium by ejecting inks from printing nozzles based on the print data stored in the print data buffer 12. The present embodiment will be described by taking as an example a case where the print head has four printing nozzle arrays in total for inks of three chromatic colors of cyan (C), magenta (M), and yellow (Y) and a metallic (Me) ink.

Note that the printing apparatus 1 is also capable of directly receiving and printing image data stored in a storage medium such as a memory card and image data from a digital camera, as well as image data supplied from the image processing apparatus 2.

A main control unit 21 of the image processing apparatus 2 performs various processes on an image supplied from the image supply apparatus 3 to thereby generate image data printable by the printing apparatus 1, and includes a CPU, a ROM, a RAM, and the like. An I/F 22 passes and receives data signals to and from the printing apparatus 1. An external connection I/F 24 receives and transmits image data and the like from and to the externally connected image supply apparatus 3. A display unit 23 displays various pieces of information to the user, and an LCD or the like can be used, for example. An operation unit 25 is a mechanism with which the user performs command operations, and a keyboard and a mouse can be used, for example.

<Printing Unit of Printing Apparatus>

Figure 2:
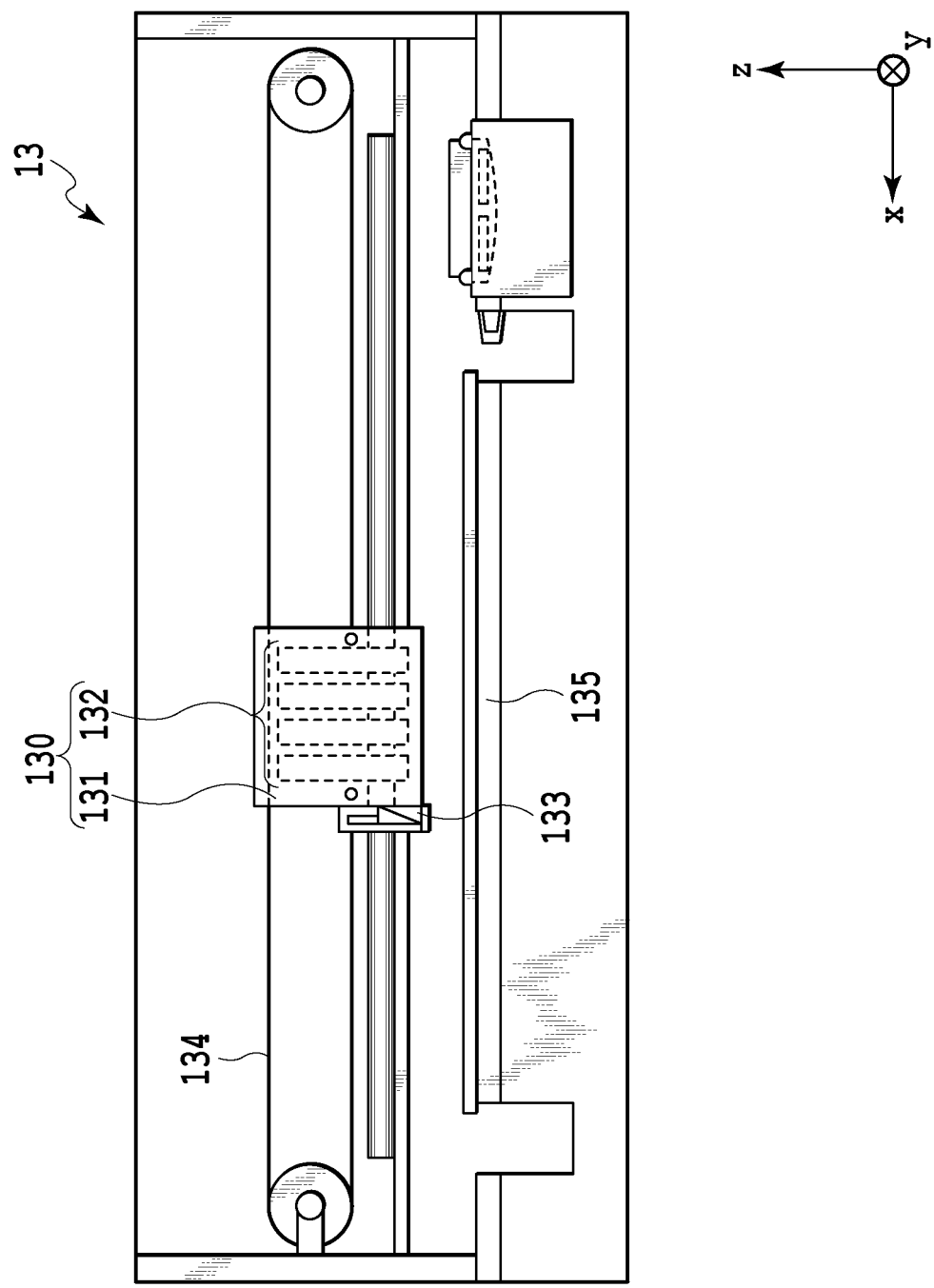
FIG. 2 is a diagram for explaining a configuration of a printing unit.

FIG. 2 is a diagram explaining a print head 130 included in the printing unit 13 in the present embodiment. The print head 130 has a carriage 131, nozzle arrays 132, and an optical sensor 133. The carriage 131, carrying the four nozzle arrays 132 and the optical sensor 133, is capable of reciprocally moving along the x direction in FIG. 2 (so-called main scanning direction) with driving force of a carriage motor transmitted to the carriage 131 through a belt 134. While the carriage 131 moves in the x direction relative to a print medium, the chromatic color inks in nozzles of the nozzle arrays 132 are ejected in the direction of gravity (−z direction in FIG. 2) based on print data. As a result, an image of a single main scan is printed on the print medium placed on a platen 135. After the completion of the single main scan, the print medium is conveyed along a conveyance direction (−y direction in FIG. 2) by a distance corresponding to the width of a single main scan. By alternately repeating a main scan and a conveyance operation as above, images are formed on the print medium in a step-by-step manner. The optical sensor 133 performs a detection operation while moving along with the carriage 131 to determine whether a print medium is present on the platen 135.

<Description of Print Head>

Figure 3:
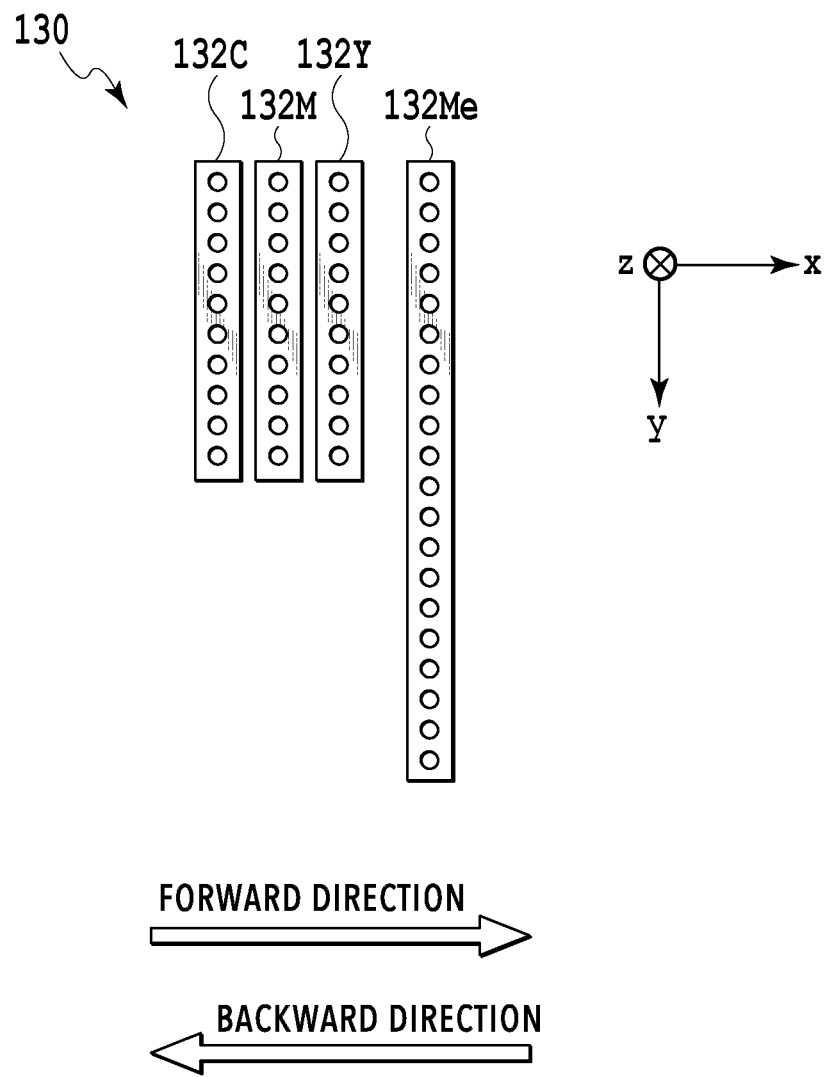
FIG. 3 is a diagram showing an arrangement of nozzle arrays.

FIG. 3 is a diagram showing an arrangement of the nozzle arrays of the print head 130 as viewed from the upper surface of the apparatus (z direction). Four nozzle arrays are disposed in the print head 130. Specifically, a nozzle array 132C for the C ink, a nozzle array 132M for the M ink, a nozzle array 132Y for the Y ink, and a nozzle array 132Me for the Me ink are disposed at different positions in the x direction. The C ink, the M ink, the Y ink, and the Me ink are ejected from the nozzles of the nozzle array 132C, the nozzles of the nozzle array 132M, the nozzles of the nozzle array 132Y, and the nozzles of the nozzle array 132Me, respectively. In each nozzle array, a plurality of nozzles for ejecting ink droplets are arrayed along the y direction at a predetermined pitch. Note that the number of nozzles included in each nozzle array is a mere example, and is not limited to the number shown.

<Silver Nanoink>

The metallic ink (Me ink) used in the present embodiment contains silver particles. The melting point of a metallic particle is dependent on the type of its substance and the size of the particle. The smaller the particle size, the lower the melting point. After the silver particles contained in the Me ink, having a small particle size of about several to several hundred nanometers, land on the printing surface of a print medium, their dispersed state breaks with reduction of water, and nearby silver particles fuse to one another, thereby forming a silver fused film. By forming the fused silver film on the print medium in this manner, a printed image having glossiness is formed.

Constituent components of the Me ink containing the silver particles used in the present embodiment will be described below.

<Silver Particles>

The silver particles used in the present embodiment are particles mainly containing silver, and the purity of silver in a silver particle may be 50% by mass or higher. In an example, the silver particles may contain another metal, oxygen, sulfur, carbon, and so on as sub components and may be made of an alloy.

The method of producing the silver particles is not particularly limited. However, considering particle size control and dispersion stability of the silver particles, the silver particles are preferably produced from a water-soluble silver salt by various synthetic methods utilizing reduction reactions.

The average particle size of the silver particles used in the present embodiment is preferably 1 nm or more and 200 nm or less and more preferably 10 nm or more and 100 nm or less in view of the storage stability of the ink and the glossiness of images to be formed with the silver particles.

Note that as for a specific method of measuring the average particle size, FPAR-1000 (manufactured by Otsuka Electronics Co., Ltd.; cumulant method analysis), Nanotrac UPA150EX (manufactured by NIKKISO CO., LTD., employing an accumulated value of 50% of the volume-average particle size), or the like utilizing scattering of a laser beam can be used for the measurement.

In the present embodiment, the content (% by mass) of the silver particles in the ink is preferably 2.0% by mass or more and 15.0% by mass or less based on the entire mass of the ink. In a case where the content is less than 2.0% by mass, the metallic glossiness of an image may be low. On the other hand, in a case where the content is more than 15.0% by mass, ink overflow is likely to occur, which may in turn cause print twists.

<Dispersant>

The method of dispersing the silver particles is not particularly limited. It is possible to use, for example, silver particles dispersed by a surfactant, resin-dispersed silver particles dispersed by a dispersing resin, or the like. It is of course possible to use a combination of metallic particles differing in dispersion method.

As the surfactant, an anionic surfactant, a nonionic surfactant, a cationic surfactant, or an amphoteric surfactant can be used. Specifically, the following can be used, for example.

Examples of the anionic surfactant include fatty acid salts, alkylsulfuric acid ester salts, alkylarylsulfonic acid salts, alkyldiarylether disulfonic acid salts, dialkylsulfosuccinic acid salts, alkylphosphoric acid salts, naphtalenesulfonic acid formalin condensates, polyoxyethylene alkylphosphoric acid ester salts, glycerol borate fatty acid esters, and so on.

Examples of the nonionic surfactant include polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-containing surfactants, silicon-containing surfactants, and so on. Examples of the cationic surfactant include alkylamine salts, quaternary ammonium salts, alkylpyridinium salts, and alkylimidazolium salts. Examples of the amphoteric surfactant include alkylamine oxides, phosphadylcholines, and so on.

As the dispersing resin, it is possible to use any resin as long as it has water solubility or water dispersibility. Particularly preferable among those is a dispersing resin whose weight average molecular weight is 1,000 or more and 100,000 or less, and more preferable is a dispersing resin whose weight average molecular weight is 3,000 or more and 50,000 or less.

Specifically, the following can be used as the dispersing resin, for example: Styrene, vinyl naphthalene, aliphatic alcohol ester of α, β-ethylenically unsaturated carboxylic acid, acrylic acid, maleic acid, itaconic acid, fumaric acid, vinyl acetate, vinyl pyrrolidone, acrylamide, or polymers using derivatives of these materials or the like as monomers. Note that one or more of the monomers constituting any of the polymers are preferably hydrophilic monomers, and a block copolymer, a random copolymer, a graft copolymer, a salt thereof, or the like may be used. Alternatively, a natural resin such as rosin, shellac, or starch can be used as well.

In the present embodiment, it is preferable that an aqueous ink contain a dispersant for dispersing the silver particles and that the mass ratio of the content (% by mass) of the dispersant to the content (% by mass) of the silver particles is 0.02 or more and 3.00 or less.

In a case where the mass ratio is less than 0.02, the dispersion of the silver particles is unstable, and the ratio of the silver particles that get attached to heat generating portions of the print head 130 increases. This in turn increases the likelihood of abnormal bubble generation and may result in print twists due to ink overflow. On the other hand, in a case where the mass ratio is more than 3.00, the dispersant may hinder the fusion of the silver particles during image formation and thereby lower the metallic glossiness of the image.

<Surfactant>

The ink containing the silver particles used in the present embodiment preferably contains a surfactant in order to achieve more balanced ejection stability. As the surfactant, the above-described anionic surfactants, nonionic surfactants, cationic surfactants, or amphoteric surfactants can be used.

Among them, any of the nonionic surfactants is preferably contained. Among the nonionic surfactants, particularly preferable are a polyoxyethylene alkyl ether and an acetylene glycol ethylene oxide adduct. The hydrophile-lipophile balance (HLB) of these nonionic surfactants is 10 or more. The content of the thus used surfactant in the ink is preferably 0.1% by mass or more. Also, the content is preferably 5.0% by mass or less, more preferably 4.0% by mass or less, and further preferably 3.0% by mass or less.

<Aqueous Medium>

For the ink containing the silver particles used in the present embodiment, it is preferable to use an aqueous medium containing water and a water-soluble organic solvent. The content (% by mass) of the water-soluble organic solvent in the ink is 10% by mass or more and 50% by mass or less and more preferably 20% by mass or more and 50% by mass or less based on the entire mass of the ink. The content (% by mass) of the water in the ink is preferably 50% by mass or more and 88% by mass or less based on the entire mass of the ink.

Specifically, the following can be used as the water-soluble organic solvent, for example: alkyl alcohols such as methanol, ethanol, propanol, propanediol, butanol, butanediol, pentanol, pentanediol, hexanol, and hexanediol; amides such as dimethylformamide and dimethylacetamide; ketones or keto alcohols such as acetone or diacetone alcohol; ethers such as tetrahydrofuran and dioxane; polyalkylene glycols having an average molecular weight of 200, 300, 400, 600, 1,000, or the like such as polyethylene glycol and polypropylene glycol; alkylene glycols having an alkylene group having two to six carbon atoms such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; and lower alkyl ethers of polyhydric alcohols such as ethylene glycol monomethyl (or ethyl) ether, diethylene glycol methyl (or ethyl) ether, and triethylene glycol monomethyl (or ethyl) ether. Also, as the water, deionized water (ion-exchanged water) is preferably used.

<Print Medium>

The print medium in the present embodiment has a base material and at least one ink receiving layer. In the present embodiment, the print medium is preferably an inkjet print medium for use in inkjet printing methods.

<Mechanism of how Silver Printed Region Appears Brownish>

The mechanism of how a silver printed region appears brownish will be described with reference to FIGS. 4A to 7B. The Me ink containing the silver particles used in the present embodiment (this ink may be called silver ink) is a brownish liquid because particular wavelengths of light are absorbed due to a phenomenon called localized surface plasmon resonance in which the oscillation of free electrons inside the metal exposed to the electric field of the light (plasmon) and the oscillation of the light resonate with each other. The wavelengths absorbed by this localized surface plasmon resonance vary by the particle shape and size. With the silver particles used in the present embodiment, the extinction spectrum peaks on a low-wavelength side of the visible light range, and therefore the Me ink is a liquid appearing brownish due to the localized surface plasmon resonance.

Figure 4A:
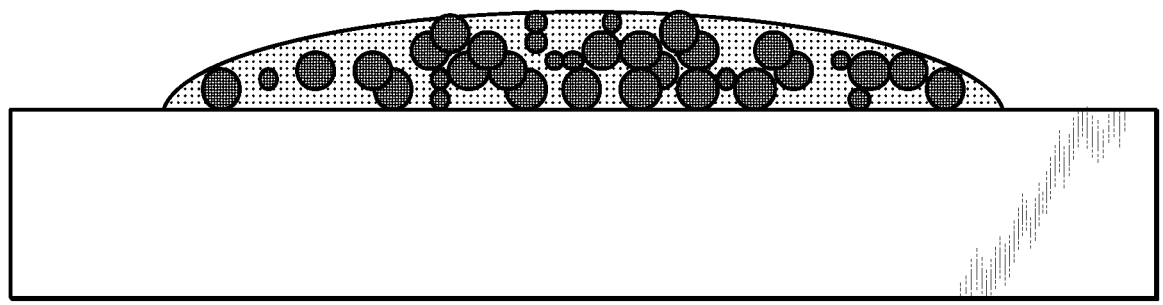
FIGS. 4A to 4C are schematic diagrams showing silver particles in the process of forming a fused film.
Figure 4B:
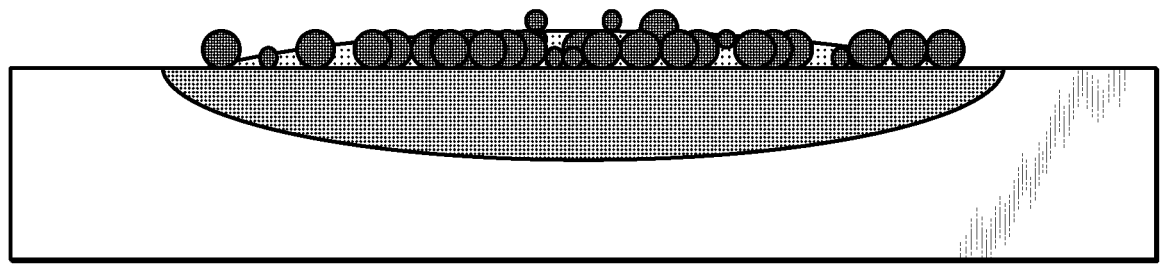
Figure 4C:
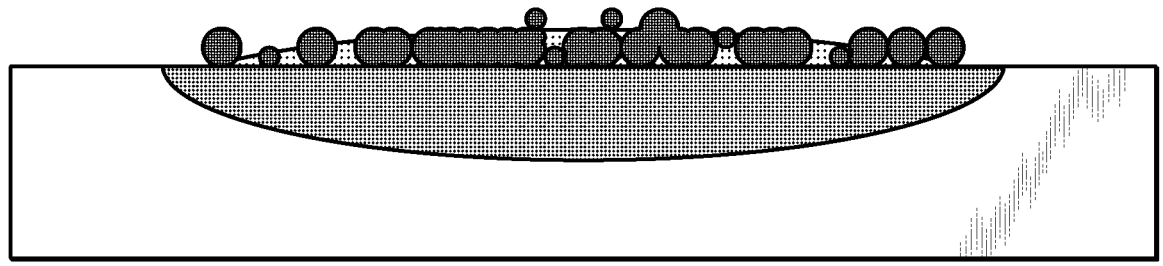

FIGS. 4A to 4C are diagrams explaining the mechanism of how a dot of the Me ink appears brownish. FIG. 4A is a schematic diagram showing a cross section at a moment when the Me ink has landed on a paper surface. The cross-sectional shape of the Me ink is a dome shape due to the surface tension of the ink. Also, the silver particles are evenly dispersed inside this dome-shaped ink.

FIG. 4B shows a state where the aqueous medium of the Me ink has permeated the print medium and the silver particles are trapped on the surface of the print medium. Since the ink before the permeation of the aqueous medium is in the dome shape, the number of silver particles on the print medium per unit area increases toward the center of the dot and decreases toward the outer periphery of the dot. As the aqueous medium permeates the print medium, the silver particles floating in the aqueous medium land on the surface of the print medium directly below. Thus, the density of the silver particles on the surface of the print medium increases toward the center of the dot and decreases toward the outer periphery of the dot.

FIG. 4C is a diagram showing a state where silver particles trapped on the surface of the print medium have fused to one another. Since the silver particles fuse to one another via contact between the particles, the fusion is more likely to occur in a region where the density of silver particles is higher. Hence, in a region closer to the outer periphery of the dot, the density of silver particles is lower and the number of isolated silver particles is larger, and thus the likelihood of occurrence of fusion is lower than that in a center region of the dot.

Figure 5A:
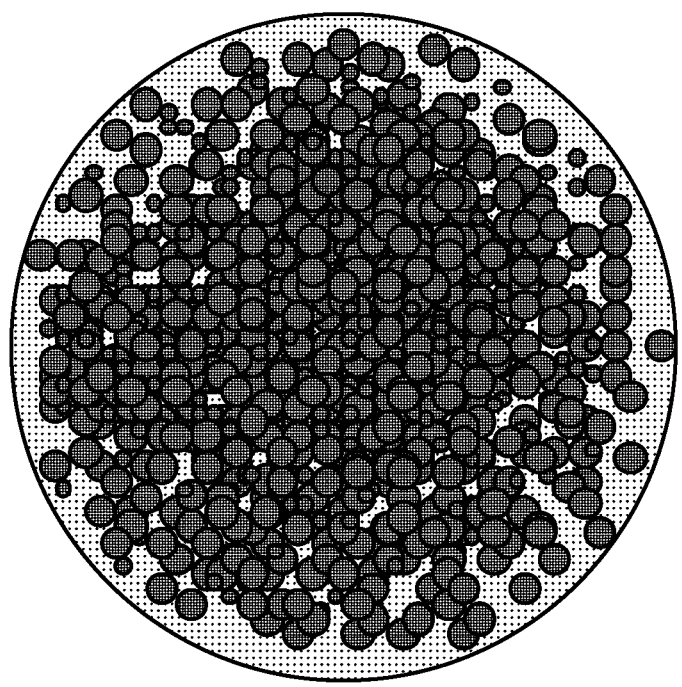
FIGS. 5A and 5B are schematic diagrams showing contacting portions of silver particles in the process of forming a fused membrane.
Figure 5B:
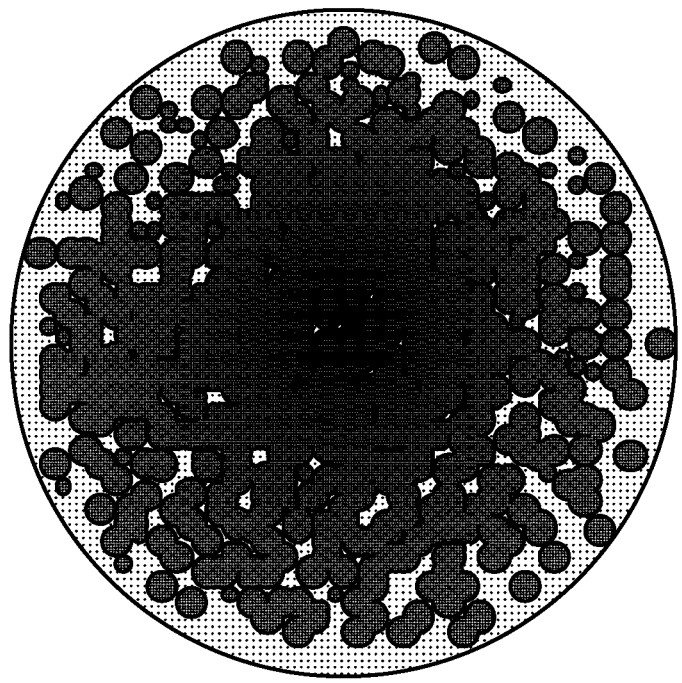

FIGS. 5A and 5B are schematic diagrams showing states where a single dot of the Me ink is printed on a print medium. FIG. 5A is a schematic diagram showing the distribution of density of the silver particles after the permeation of the aqueous medium. FIG. 5B is a schematic diagram showing a state where contacting portions of silver particles have fused to form a silver film. At the outer periphery of the dot, there are silver particles that have not contacted and thus not fused to others. In a case where the silver in the Me ink used in the present embodiment fails to fuse and remains in the particle form, the silver appears brownish due to the above-mentioned localized surface plasmon resonance. Consequently, the brownish color due to the localized surface plasmon resonance remains at the outer periphery of a metallic dot (Me dot), at which fusion is less likely to occur. The above is a description of the mechanism of how an Me dot appears brownish.

Figure 6:
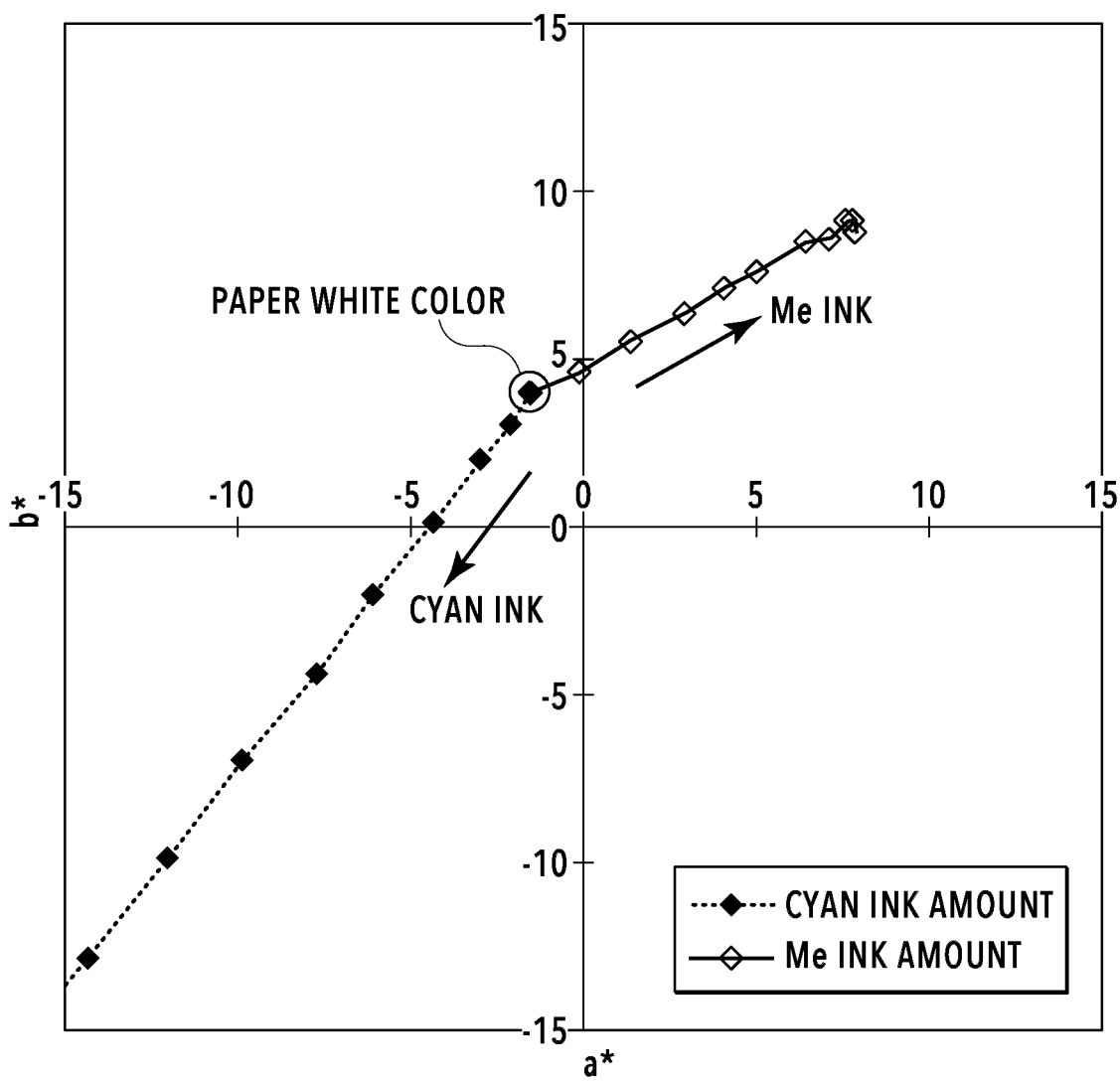
FIG. 6 is a diagram showing the direction of the color of coloring of an Me ink.

FIG. 6 is a diagram showing the direction of the colors of the coloring in a case where gradations are generated using the Me ink. In the example of the inkjet printing apparatus in the present description, graininess is usually rendered less visually recognizable. To do so, each gradation is generated by using a dot arrangement provided with a blue noise characteristic to the extent possible. Meanwhile, the print medium used is mat paper used as kraft paper or the like.

The piece of data surrounded by the circle in FIG. 6 represents the a* value and the b* value of the paper white color. The solid line represents changes in color in the a*b* plane from the paper white color as a result of applying the Me ink. The dashed line represents changes in color from the paper white color as a result of applying the cyan ink. This shows that the color of the Me ink changes in a substantially opposite direction from that of the cyan ink. Hence, it is possible to reduce the visibility of the coloring of the Me ink with the cyan ink.

Figure 7:
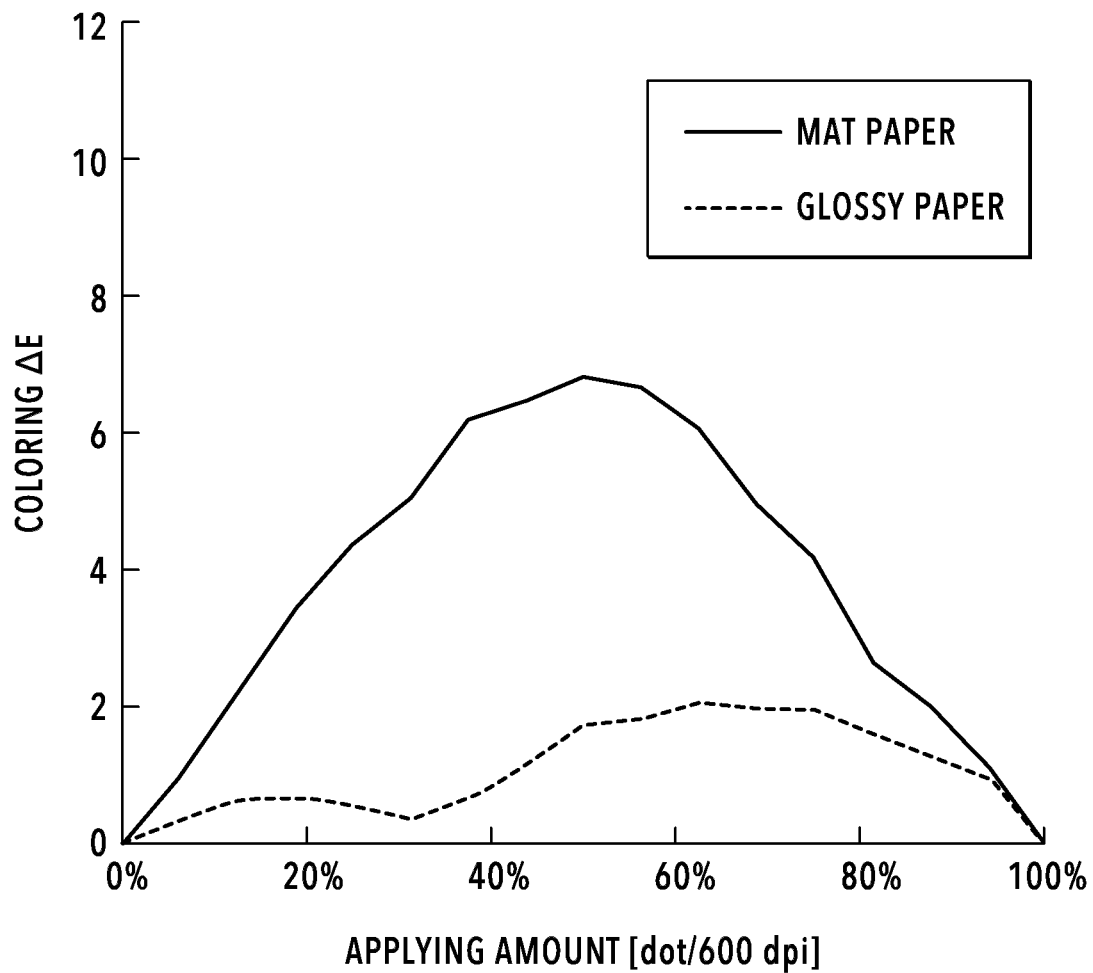
FIG. 7 is a diagram showing degrees of the coloring in cases where gradations are generated using the Me ink.

FIG. 7 is a diagram showing degrees of the brownish coloring in cases where gradations are generated using the Me ink in a similar manner to FIG. 6. The print media used are mat paper (solid line) used as kraft paper or the like, and glossy paper (dashed line) used as photographic paper or the like.

The horizontal axis represents the Me ink applying amount, and a state where a single dot is printed at 600 dpi is 100%. The vertical axis represents a coloring degree $\Delta E$ being the distance from a* and b* being the color of the Me ink in the non-colored state in the a*-b* plane of an Lab color space. In the present description, the color in the non-colored state corresponds to a* and b* values on a straight line in the Lab space connecting the L*, a*, and b* values of the silver in a state where the Me ink is sufficiently applied so as to ensure fusion of the silver particles, and the L*, a*, b* values of the paper white color. The state where the Me ink is sufficiently applied corresponds to, for example, about 11 ng of the Me ink per pixel at 600 dpi.

Specifically, with $(L_m, a_m, b_m)$, $(L_w, a_w, b_w)$, and $(L_e, a_e, b_e)$ as the L*, a*, b* values of the silver in the state where the Me ink is sufficiently applied, the paper white color, and the evaluation target respectively, the coloring degree $\Delta E$ is calculated as the equation (1) below.

$$\Delta E = [\{a^*_m(L_e) - a_e\}^2 - \{b^*_m(L_e) - b_e\}^2]^{0.5} \quad (1)$$

Here, the following are given:

(The equation of a straight line for $a^*$) $a^*_m(L^*) = a_a \times L^* + b_a$ (Slope) $a_a = (a_m - a_w)/(L_m - L_w)$ (Intercept) $b_a = a_w - a_a \times L_w$ (The equation of a straight line for $b^*$) $b^*m(L^*) = a_b \times L^* + b_b$ (Slope) $a_b = (b_m - b_w)/(L_m - L_w)$ (Intercept) $b_b = b_w - a_b \times L_w$ Referring to FIG. 6 again, it can be seen that the coloring is strong at intermediate tones of gradation with both the mat paper and the glossy paper. This is because the metallic tone representations are printed by dispersing dots as much as possible with use of dispersed dot arrangements such as blue noise, and accordingly the number of isolated dots is large and the ratio of Me dots with brownish outer peripheries is large. The coloring is low in a range where the density of gradation is high because the brownish outer peripheries of dots are overlapped by other neighboring dots, so that the silver particles at the brownish outer peripheries fuse to silver particles contained in the ink droplets of the other dots or the brownish color is covered by the fused silver film formed by the other dots.

In other words, in a case where the Me ink is gradually added to the paper white color to express tones, the coloring increases in a lone-tone range with increase in the ratio of the outer peripheries of Me dots, whereas the coloring decrease in a high-tone range due to overlap between the outer peripheries of Me dots.

Note that the evaluation value $\Delta E$ of the degree of the coloring is not limited to the evaluation value in the present description. In an example, simply $a^*_m = 0$ and $b^*_m = 0$ may be used instead of $a^*_m(L^*)$ and $b^*_m(L^*)$.

First Embodiment

In light of the above finding, in a first embodiment, a description will be given of an example of reducing the coloring of the Me ink by using the cyan ink, which has an opposite hue of that of the coloring of the Me ink, according to the degree of the coloring of the Me ink.

<Print Data Generation Process>

Figure 8:
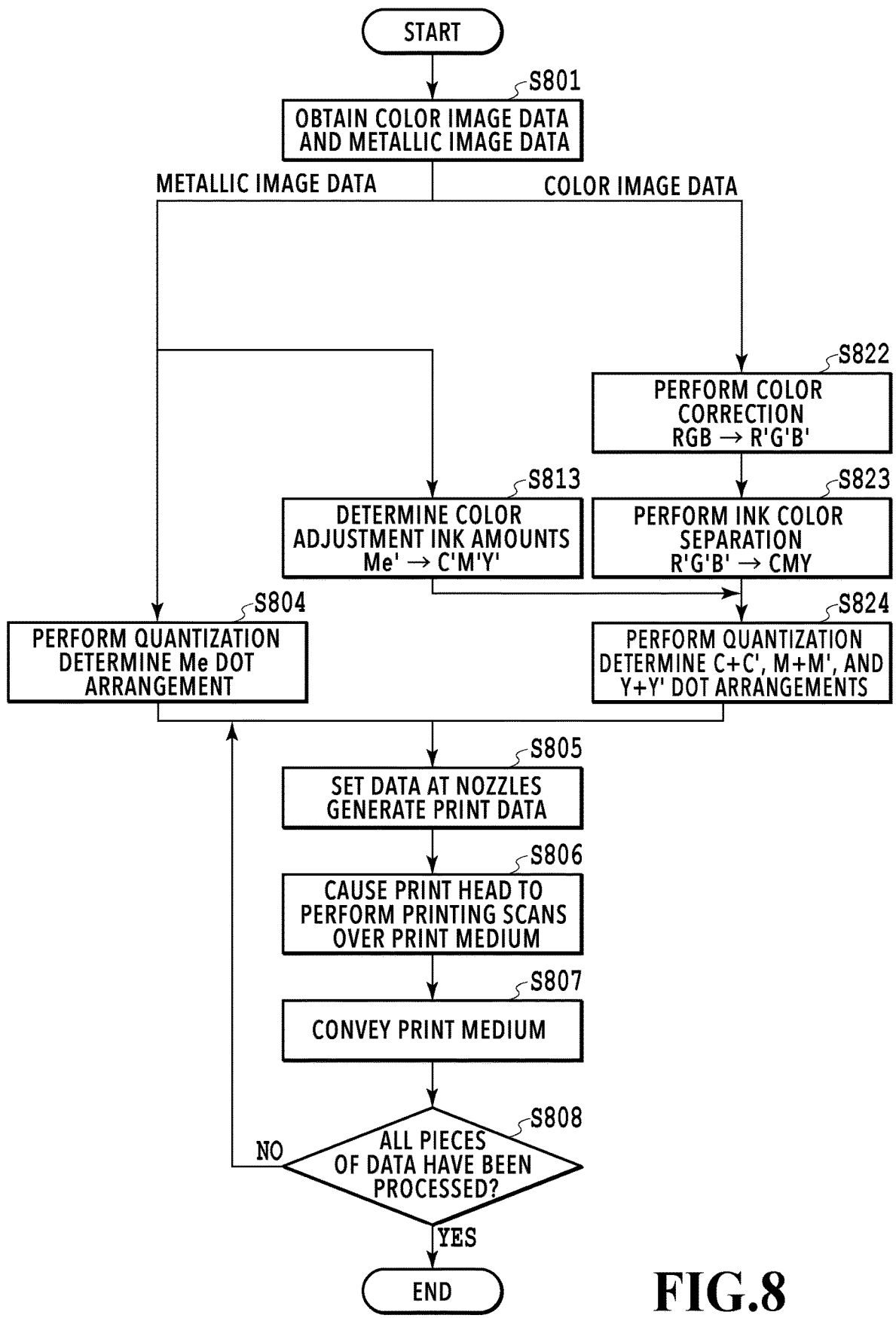
FIG. 8 is a flowchart showing a print data generation process and a printing operation.

FIG. 8 is a flowchart explaining a process of generating print data based on image data (referred to as the print data generation process) and a printing operation executed by the main control unit 11 of the printing apparatus 1 in the present embodiment. The CPU installed in the main control unit 11 of the printing apparatus 1 deploys a program stored in the ROM into the RAM and executes the deployed program. As a result, each process in FIG. 8 is executed. Alternatively, the functions of some or all of the steps in FIG. 8 may be implemented with hardware such as an ASIC and an electronic circuit. Meanwhile, the symbol "S" in the description of each process means a step in the flowchart.

In S801, the main control unit 11 obtains color image data and metallic image data transmitted from the image processing apparatus 2. The color image data indicates the tones in a color image while the metallic image data indicates the tones in a metallic image. Thereafter, the color image data and the metallic image data are each processed. It is to be noted that in FIG. 8 a process block is set for each group of processes in order to facilitate understanding. A process block into which a plurality of arrows are inputted (e.g., S805) is a process block whose processes are started in response to completion of the processes in each of the blocks outputting the arrows (the same applies below to the flowcharts herein). In the flowchart of FIG. 8, parallel processing may be performed, or the color image data and the metallic image data may be sequentially processed.

In S822, the main control unit 11 executes a process of converting the color image data obtained in S801 into image data supporting the color gamut of the printing apparatus 1 (color correction process). In an example, by this step, image data in which each pixel has an 8-bit value for each of R, G, and B channels is converted into image data in which each pixel has a 12-bit value for each of R', G', and B' channels. In the conversion in this step, a publicly known technique may be used such as performing matrix calculation processing or referring to a three-dimensional look-up table (hereinafter 3DLUT) stored in the ROM or the like in advance. Note that the metallic image data obtained in S801 corresponds to a grayscale image whose tones are to be expressed with eight bits by the printing apparatus 1, and a color correction process equivalent to that in this step is not performed on the metallic image data.

In S823, the main control unit 11 executes a process of separating the image data derived in S822 into pieces of image data of the respective ink colors (referred to as the ink color separation process). In an example, by this step, the image data in which each pixel has a 12-bit value for each of the R', G', and B' channels is separated into pieces of image data of the ink colors to be used in the printing apparatus 1 (i.e., pieces of 16-bit tone data of C, M, and Y). Meanwhile, in this step too, a publicly known technique may be used such as referring to a 3DLUT stored in the ROM or the like in advance, as in S822. Note that the metallic image data obtained in S801 corresponds to an eight-bit grayscale image for the printing apparatus 1, and a color separation process equivalent to that in this step is not performed on the metallic image data.

In S813, based on the metallic image data obtained in S801, the main control unit 11 obtains a color adjustment ink amount for each of the colors of the C, M, an Y inks determined in advance for the inputted tone value of the metallic image data. Note that in this step, the color adjustment ink amounts can be obtained by a method such as referring to data such as one-dimensional look-up data (hereinafter 1DLUT) stored in the ROM or the like in advance, indicating the correspondence between the inputted tone values of pieces of metallic image data and values indicating color adjustment ink amounts. That is, performed is processing that, based on the tone value of a predetermined region in the metallic image data, obtains the amounts of the chromatic color inks to be applied onto that predetermined region. Meanwhile, while an example in which color adjustment is performed using the cyan ink will be described in the present embodiment, it is possible to further improve the accuracy of adjustment of the color by using the inks of the other colors.

In S824, for each pixel, the main control unit 11 firstly calculates sets of inputted tone values by adding up the pixel values of the three ink colors derived in S823 and the color adjustment ink amounts of these colors obtained in S813. Then, the main control unit 11 performs a predetermined quantization process on the inputted tone value data for each ink to thereby convert the inputted tone value data into one-bit quantized data. Specifically, a signal value (tone value) for each ink is converted into an ejection level specifying an ink ejection volume per unit area. In a case where binary quantization is performed for example, the tone value data of each of C, M, and Y is converted by this step into one-bit data in which each pixel has a value of either 0 or 1 as an ejection level.

Also, in S804, the main control unit 11 performs a predetermined quantization process on the metallic image data to thereby convert this tone data into one-bit quantized data. Specifically, a signal value for each ink is converted into an ejection level specifying an ink ejection volume per unit area. In a case where binary quantization is performed for example, the Me tone value data is converted by this step into one-bit data in which each pixel has a value of either 0 or 1 as an ejection level.

By S824 and S804, a final arrangement of dots on a paper surface is determined, and dot arrangement data is generated for each of the C (cyan), M (magenta), Y (yellow), and Me (metallic) inks. In a case where the print head 130 is capable of arranging dots on a paper surface at a resolution of 600 dpi×600 dpi, whether to arrange a dot is determined for each set of coordinates obtained by partitioning the paper surface into a 600 dpi×600 dpi grid pattern.

In S805, the main control unit 11 generates print data for a single scan from the dot arrangement data for each ink generated in S804, S814, and S824, and sets the print data at a predetermined region in the corresponding one of the C (cyan), M (magenta), Y (yellow), and Me (metallic) nozzle arrays. Then in S806, the main control unit 11 performs actual printing on a print medium with the print data for the single scan generated in S805. Meanwhile, feed of the print medium (not shown) is performed prior to the printing with the first scan.

In S807, the main control unit 11 conveys the print medium. The specific contents of the nozzle positions used within the nozzle arrays, the amount of conveyance, and so on in S805 to S807 will be described in <Description of Printing Operation> to be discussed later. In S808, the main control unit 11 determines whether the processing of all pieces of print data and the corresponding printing scans have been completed. If the result of the determination is yes, discharge of the printing medium (not shown) and so on are performed, and the processing is terminated. If not all pieces of print data have been processed, the main control unit 11 returns to S805 and repeats the processes.

Note that while the main control unit 11 of the printing apparatus 1 executes each process in FIG. 8 in the above description, the present embodiment is not limited to this configuration. Specifically, the main control unit 21 of the image processing apparatus 2 may execute all or some of the processes in FIG. 8. The above is the contents of the print data generation process and the printing operation in the present embodiment.

<Description of Printing Operation>

Next, an example of a specific printing operation in the present embodiment will be described. In image formation, the print head 130 is caused to eject each ink while being scanned along the main scanning direction. Then, after a single main scan is completed, the print medium is conveyed along a sub scanning direction (−y direction). By repeating a main scan of the print head 130 and an operation of conveying the print medium as above, images are formed on the print medium in a step-by-step manner.

In the present embodiment, the chromatic color inks and the Me ink are ejected onto an identical region on the print medium at different timings in order to obtain a metallic color expression. Here, attention is to be paid to these timings. Specifically, the Me ink is ejected first, and the chromatic color inks are then ejected after a certain time interval or longer. Providing such a time interval ensures permeation of the aqueous medium contained in the Me ink into the print medium, evaporation of the aqueous medium, and fusion of silver particles. By laying the chromatic color inks over the Me ink in such a state, a fine metallic color is obtained.

Figure 9:
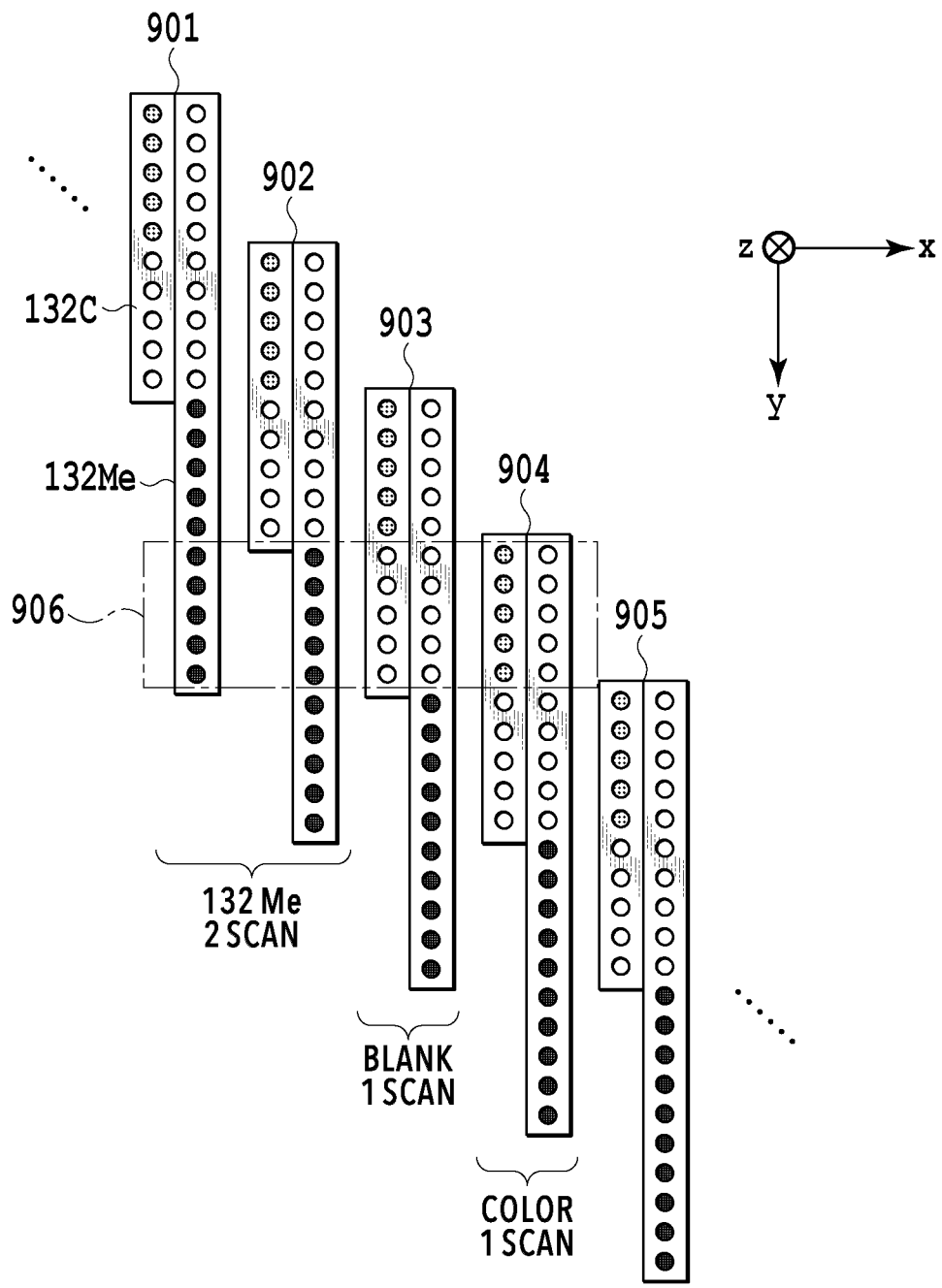
FIG. 9 is a diagram showing the printing operation.

FIG. 9 is a diagram explaining the specific printing operation in the present embodiment. States 901 to 905 show the relative positional relationships between the nozzle arrays 132C, 132M, 132Y, and 132Me above a print medium and the print medium in the y direction in five printing scans in the present embodiment in the order of the five printing scans. Note that in practice the print medium is conveyed in the −y direction (conveyance direction), but FIG. 9 shows a diagram in which the print medium is fixed in the y direction and the nozzle arrays are moved in order to facilitate understanding. Illustration of the nozzle arrays 132M and 132Y is omitted, and the nozzle array 132C is representatively illustrated since the color nozzle arrays 132C, 132M, and 132Y have the same nozzle positions in the y direction. In FIG. 9, the nozzle array 132C and the nozzle array 132Me are shown on the left side and the right side in the states 901 to 905, respectively. The hatched portions of the nozzle array 132C and the shaded portions of the nozzle array 132Me indicate the positions of nozzles used among the nozzles in the color nozzle array (referred to as the color nozzles) and the nozzles in the metallic nozzle array (referred to as the Me nozzles) in the present embodiment.

In the example of FIG. 9, the 5 nozzles in the nozzle array 132C from its end in the −y direction are used, and the 10 nozzles in the nozzle array 132Me from its end in the y direction are used. Note that in each nozzle array, the nozzles present on the y-direction end side from the center will be referred to as the conveyance-direction upstream nozzles (also referred to simply as the upstream nozzles). On the other hand, the nozzles present on the −y-direction end side from the center will be referred to as the conveyance-direction downstream nozzles (also referred to simply as the downstream nozzles). In the example of FIG. 9, the amount of conveyance of the print medium is set at an amount corresponding to five nozzles to thereby enable ejection of the Me ink first and then ejection of the chromatic color ink.

Also, in the present embodiment, as shown in FIG. 9, there are sets of 5 nozzles between the nozzles that actually eject the Me ink (the 10 downstream nozzles) and the nozzles that actually eject the chromatic color ink (the 5 upstream nozzles). Specifically, the sets of five nozzles between the nozzles that actually eject the Me ink and the nozzles that actually eject the chromatic color ink are controlled not to eject the inks. This region in which neither the Me ink nor the chromatic color ink is ejected will be referred to as a "blank nozzle region". Providing the blank nozzle region enables application of the Me ink and the chromatic color ink with a sufficient time interval therebetween. Note that as this blank nozzle region (the number of nozzles controlled not to eject the inks), a suitable region can be set as appropriate according to the scan speed of the print head, the conveyance speed of the print medium, and the like.

In the case illustrated in FIG. 9, a time interval equivalent to at least a single main scan is provided from the application of the Me ink to the application of the chromatic color ink. Thus, a sufficient time is ensured for the fusion of the silver particles in the Me ink applied onto the print medium. This enables reliable formation of an Me ink layer and a chromatic color ink layer on the print medium and hence enables a metallic color expression with fine glossiness and saturation.

By studying a dashed line section 906 in FIG. 9 from left, it can be seen that a predetermined region is printed in four printing scans. Specifically, it can be seen that the region is printed through a first Me-ink scan, a second Me-ink scan, a blank scan, and a first chromatic-color-ink scan in this order. The blank scan is a scan in which no ink is actually ejected. In other words, as for the Me ink, the predetermined region is printed in two printing scans. The number of these printing scans may be expressed as "passes". That is, it is possible to say that the Me ink is printed in two passes.

Figure 10:
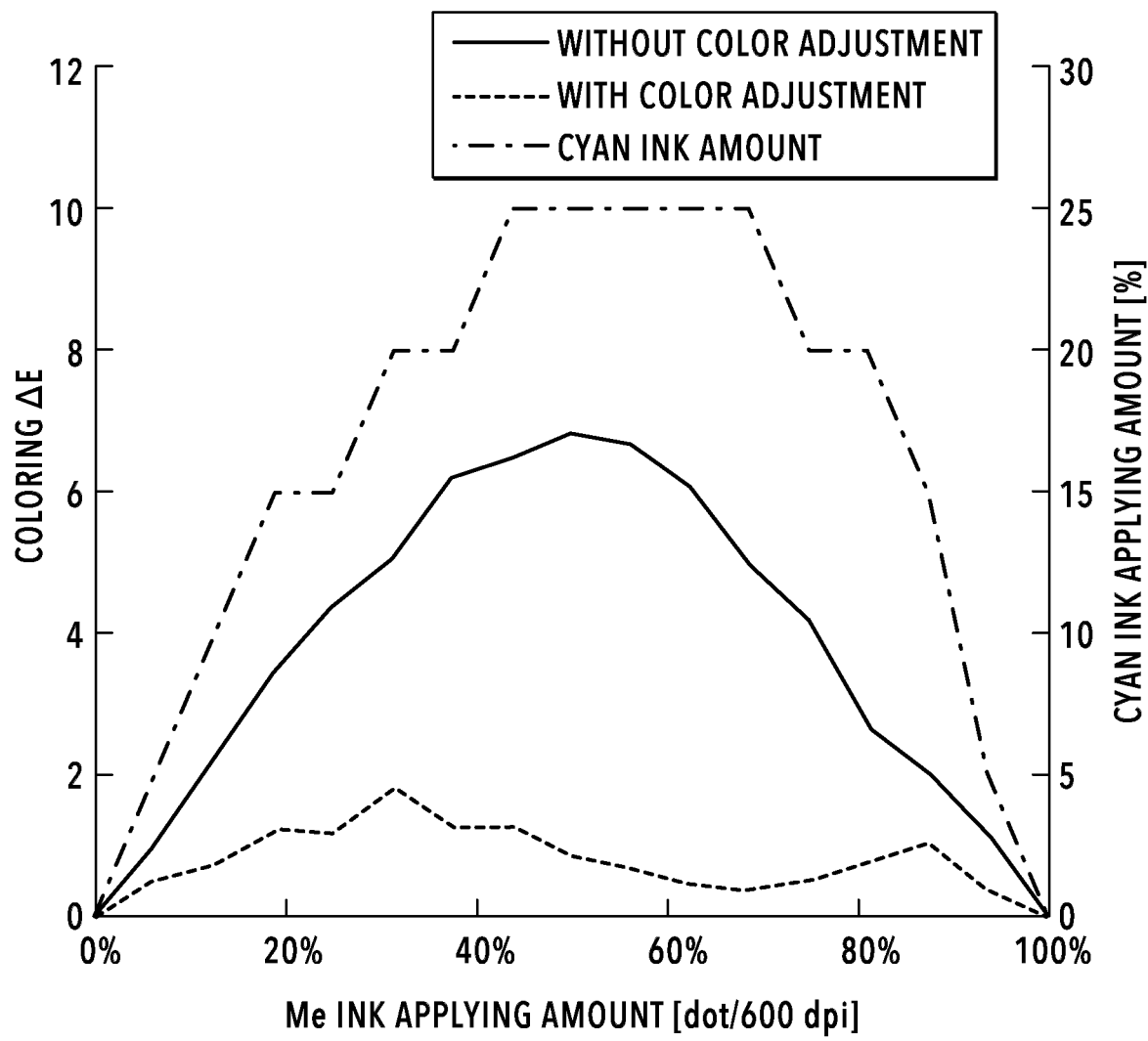
FIG. 10 is a diagram explaining that superimposing a chromatic color ink reduces the coloring.

FIG. 10 is a diagram explaining effects achieved by performing color adjustment using the cyan ink for the above-mentioned Me ink gradations. The solid line represents the degrees of the coloring in the case where the Me gradations are printed only with the Me ink, as in FIG. 7. Also, the long dashed short dashed line represents the applying amount of the cyan ink used for the adjustment. The vertical axis for the long dashed short dashed line is the second vertical axis on the right side in FIG. 10, indicating the average number of dots at 600 dpi with a single cyan ink dot measuring 5.7 ng. The dashed line in FIG. 10 represents the degrees of the coloring of the Me gradations with color adjustment performed using the cyan ink as shown by the long dashed short dashed line. FIG. 10 shows that the cyan ink reduces the degrees of the coloring of the Me gradations. The amount of the cyan ink to be used for the color adjustment varies according to an estimated degree of the coloring of the Me ink, and peaks at the middle tone, like the degree of the coloring of the Me ink does. Note that FIG. 10 shows the amount of the cyan ink to be used for the color adjustment (the ink amount determined in S813).

The coloring of th Me ink is appropriately reduced by using a chromatic color ink having an opposite color of that of the coloring of the Me ink, such as the cyan ink, and adjusting the amount of the chromatic color ink according to the degree of the coloring of the Me ink, as described above.

Meanwhile, a process is performed which involves determining a first ink amount of the cyan ink according to the degree of the coloring of the Me ink, and adding the first ink amount to a second ink amount of the cyan ink that is based on the color image data to thereby determine a third ink amount. Such a process is performed for each pixel. This reduces the impact of the change in color resulting from the reduction of the coloring of the Me ink on the color image.

Note that the ink amount corresponds to the tone value such that the larger the ink amount, the higher the tone value. Specifically, the process of determining the color adjustment ink amounts in S813 can also be seen as a process of determining the tone values (pixel values) of the image data of the colors corresponding to the chromatic color inks. In the case of performing the color adjustment only with the cyan ink, in S813, only the tone value (pixel value) of the image data of the color corresponding to the cyan ink is determined, and the tone values of the image data of the other colors do not have to be determined. Alternatively, the tone value of each pixel in the image data of the other colors may be set at 0.

Refer to FIG. 6 again. In the a*b* plane in FIG. 6, a direction determined by a value of a* and a value of b* corresponds to a hue. Also, in FIG. 6, the point with a*=0 and b*=0 (i.e., the center point in FIG. 6) corresponds to an achromatic color, and a color having a larger absolute value of a* or b* and thus located farther from the center has a higher saturation. For reduction of the coloring of the Me ink, it is preferable that the hue be within ±60 degrees from a direction opposite from the hue of the color of the coloring of the Me ink, and the saturation be less than two times the saturation of the color of the coloring. According to studies by the present inventors, such degrees of hue and saturation reduce the coloring of the Me ink and also prevent the chromatic color ink used for the coloring reduction (the cyan ink in this example) from being noticeable.

Note that as long as the coloring of the Me ink is reduced, an ink other than the cyan ink or a color obtained by combining a plurality of inks may be used to reduce the coloring of the Me ink.

Second Embodiment

In the first embodiment, a description has been given of an example where the coloring of the Me ink is reduced by figuring out the degree of the coloring corresponding to the inputted tone of the Me ink and determining the applying amount of a color adjustment ink based on the inputted tone of the Me ink. In the present embodiment, a description will be given of an example where the color adjustment ink amount is determined by estimating the degree of the coloring based on the final dot arrangement of the dots in the metallic image. According to the present embodiment, it is possible to reduce the coloring also at the edges of high-density positions and isolated points.

<Print Data Generation Process>

Figure 11:
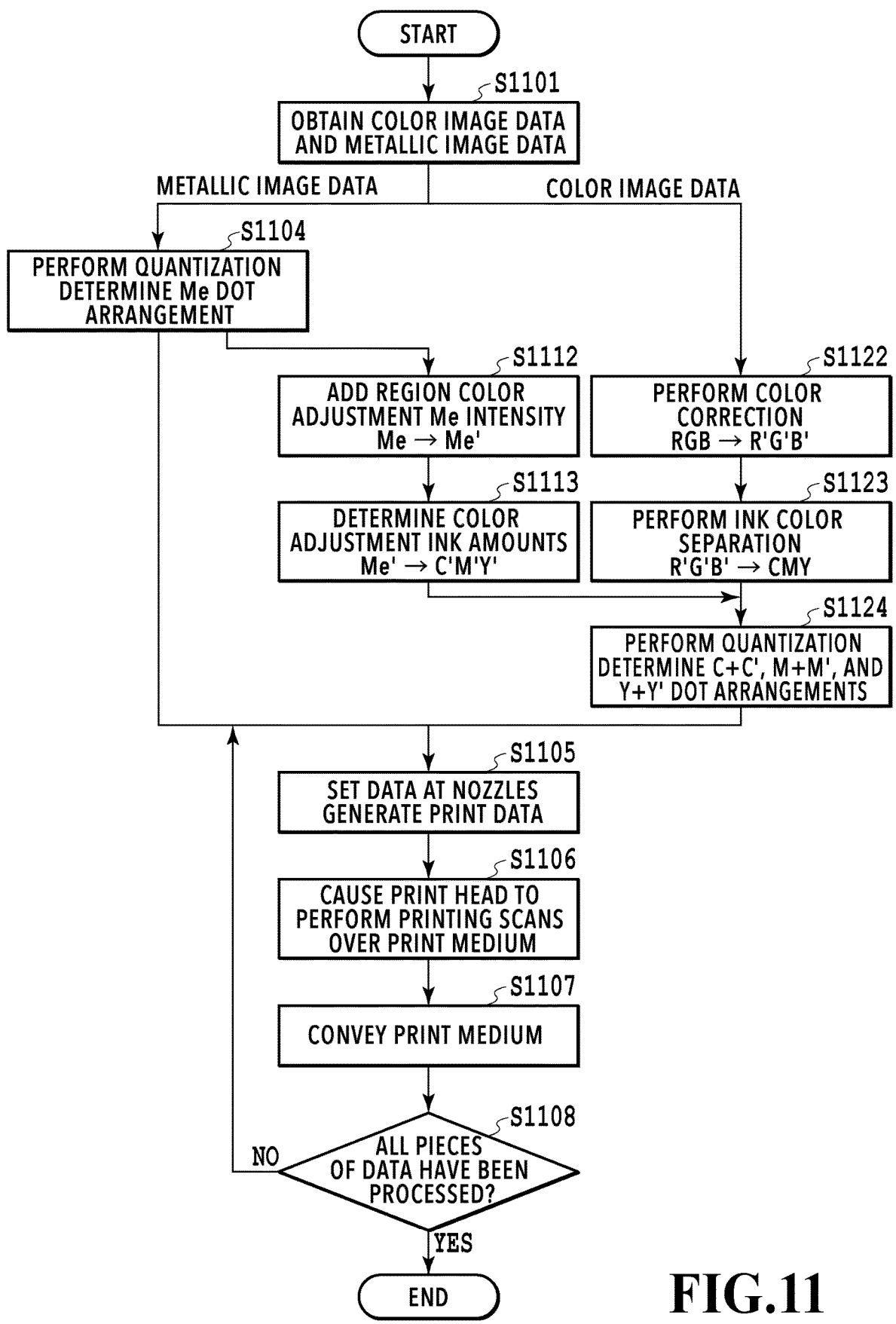
FIG. 11 is a flowchart showing a print data generation process and a printing operation.

A print data generation process executed by the main control unit 11 in the second embodiment will be described below. S1101 and S1122 to S1123 in FIG. 11 are the same processes as S801 and S822 to S823 in FIG. 8, and description thereof is therefore omitted.

In S1104, the main control unit 11 quantizes the metallic image data obtained in S1101 and determines the Me ink dot arrangement. In the present embodiment, the Me ink will be printed according to the Me ink dot arrangement obtained by the quantization in S1104.

Figure 12:
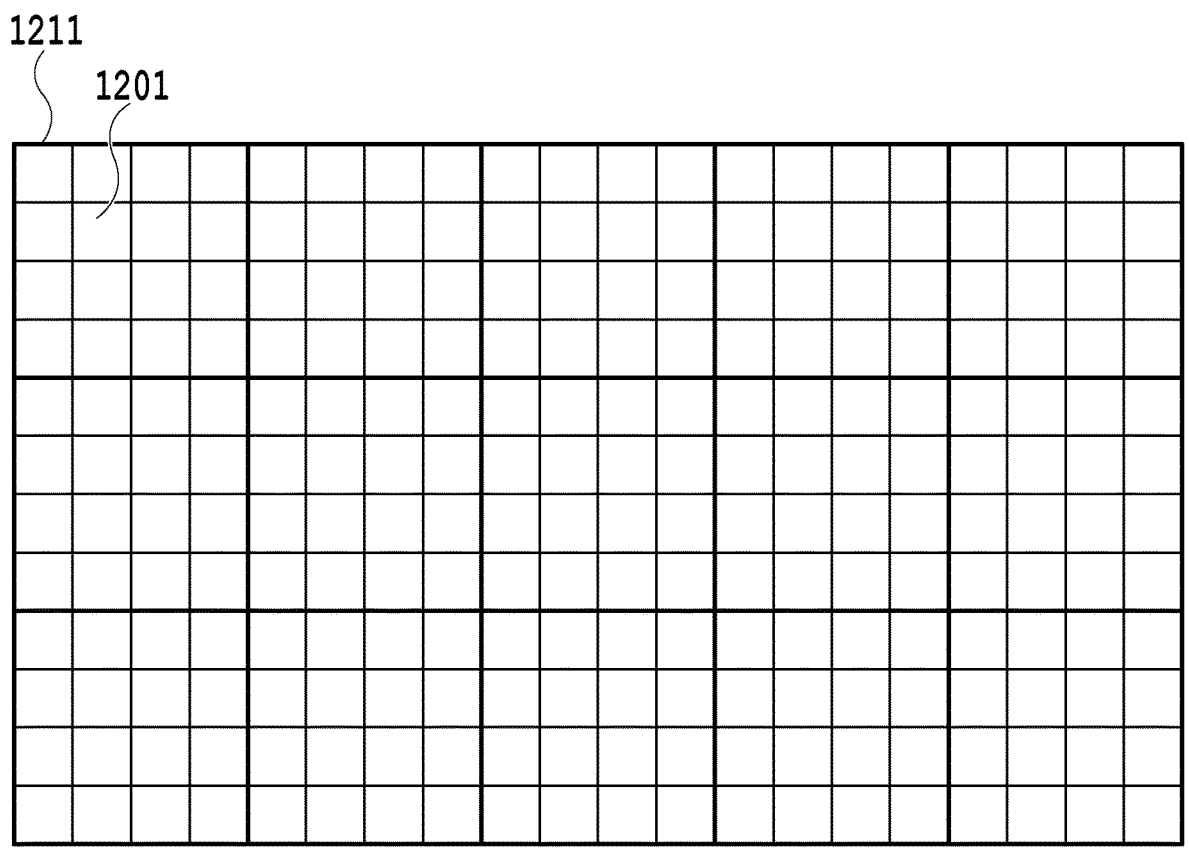
FIG. 12 is a diagram showing the unit of processing by which a color adjustment ink amount is set.

In the present embodiment, a color adjustment process is performed with a 4×4 pixel region as the unit of processing. Specifically, in the present embodiment, from each 4×4 pixel Me ink dot arrangement, the degree of the coloring with that 4×4 pixel (processing region) dot arrangement is figured out to determine the color adjustment ink amount for the dot arrangement. FIG. 12 shows the unit of processing of 4×4 pixels by which the color adjustment ink amount is set in the present embodiment. Each region 1201 shown by thin lines represents the size of a pixel. Each region 1211 shown by bold lines is a 4×4 pixel processing region in which a color adjustment ink amount will be set, and a color adjustment ink amount will be set in these regions in turn.

In S1112, based on the Me ink dot arrangement in a 4×4 pixel processing region determined in S1104, the main control unit 11 derives a region color adjustment intensity Me' that determines the color adjustment ink amount in that processing region. The process of S1112 is performed for all processing regions in turn. By the end of the above process, a region color adjustment intensity Me' is set for each 4×4 pixel processing unit region.

Figure 13:
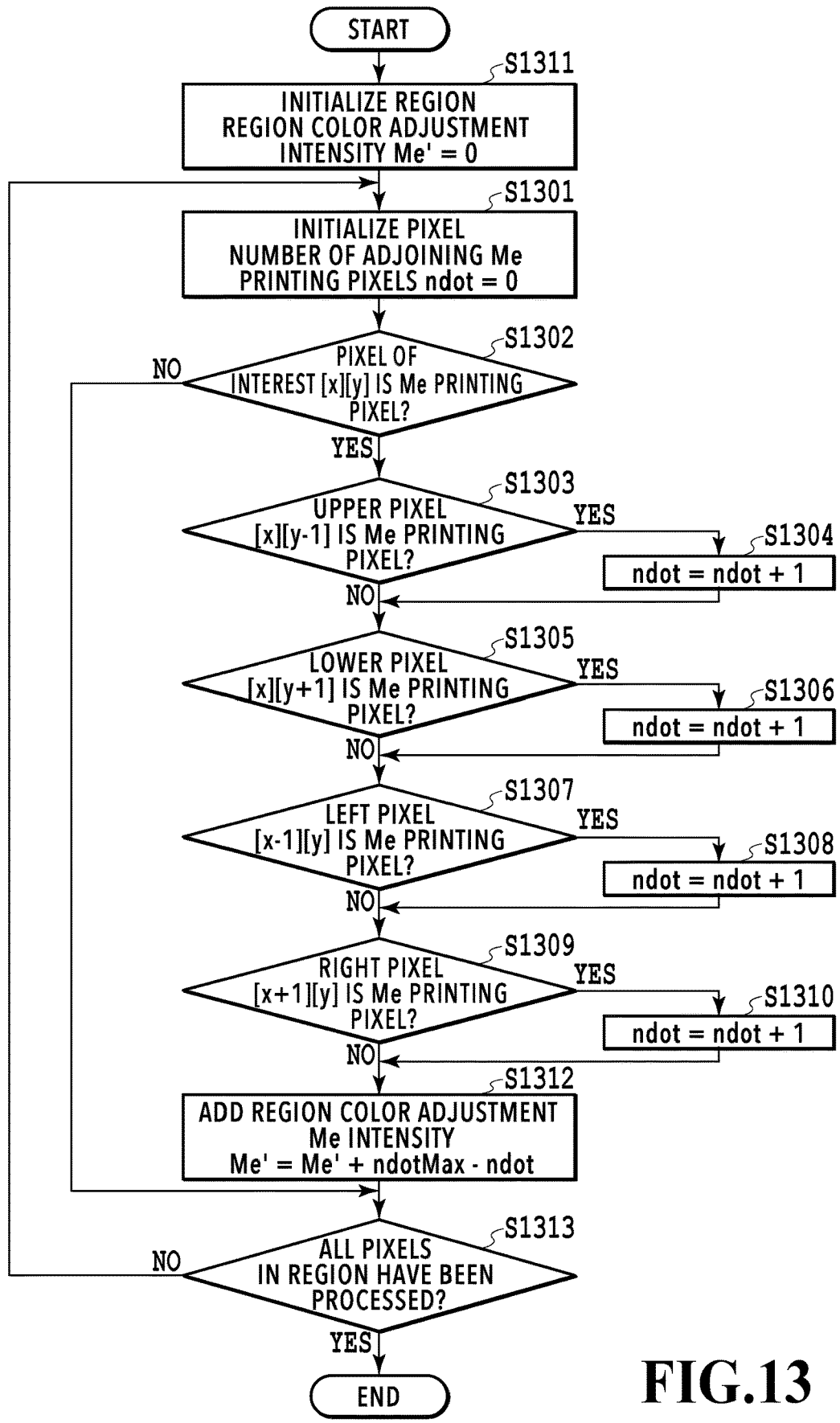
FIG. 13 is a flowchart of derivation of region color adjustment intensity.

FIG. 13 shows a flowchart of the derivation of the region color adjustment intensity Me' for one processing region in S1112.

In S1311, the main control unit 11 initializes the region color adjustment intensity Me' as below.

$Me'=0$

In S1301, the main control unit 11 initializes the number of adjoining Me pixels as below.

$n\text{dot}=0$

The subsequent processing is performed such that each pixel in the one processing region is a pixel of interest. Note that the following includes processes in each of which a determination is made on a pixel adjoining the pixel of interest. Here, in a case where the pixel of interest is located at a boundary of the processing region, the process may be performed by referring to a pixel in the other processing region adjoining the processing region.

In S1302, the main control unit 11 determines whether an Me ink printing target pixel is present at a pixel of interest [x][y]. The main control unit 11 proceeds to S1313 if the result of the determination is no. The main control unit 11 proceeds to S1303 if the result of the determination is yes.

If an Me ink printing target pixel is preset at the pixel of interest, then from S1303 through S1310, the main control unit 11 determines the number of pixels at which an Me ink printing target pixel is present among the pixels adjoining the upper, lower, left, and right sides of the pixel of interest.

In S1303, the main control unit 11 determines whether an Me ink printing target pixel is present at an upper adjoining pixel [x][y−1]. The main control unit 11 proceeds to S1305 if the result of the determination is no. If the result of the determination is yes, the main control unit 11 proceeds to S1304, in which it increments the number of adjoining Me printing target pixels by one and then proceeds to S1305.

In S1305, the main control unit 11 determines whether an Me ink printing target pixel is present at a lower adjoining pixel [x][y+1]. The main control unit 11 proceeds to S1307 if the result of the determination is no. If the result of the determination is yes, the main control unit 11 proceeds to S1306, in which it increments the number of adjoining Me printing target pixels by one and then proceeds to S1307.

In S1307, the main control unit 11 determines whether an Me ink printing target pixel is present at a left adjoining pixel [x−1][y]. The main control unit 11 proceeds to S1309 if the result of the determination is no. If the result of the determination is yes, the main control unit 11 proceeds to S1308, in which it increments the number of adjoining Me printing target pixels by one and then proceeds to S1309.

In S1309, the main control unit 11 determines whether an Me ink printing target pixel is present at a right adjoining pixel [x+1][y]. The main control unit 11 proceeds to S1311 if the result of the determination is no. If the result of the determination is yes, the main control unit 11 proceeds to S1310, in which it increments the number of adjoining Me printing target pixels by one and then proceeds to S1312.

In S1312, the main control unit 11 determines a value to be added to the region color adjustment intensity Me' at the pixel of interest [x][y], and adds the determined value to the region color adjustment intensity Me'. Specifically, an equation (2) below is used.

$$Me'=Me'+n\text{dotMax}-n\text{dot} \qquad (2)$$

Note that ndotMax is the maximum value of the number of adjoining pixels, and ndotMax=4 in the present embodiment.

The above processes from S1301 to S1312 are performed for all pixels in the 4×4 pixel processing region. In S1313, the main control unit 11 determines whether all pixels in the processing region have been processed. The main control unit 11 proceeds to S1301 if no, and terminates the processing if yes.

FIGS. 14A to 14D are diagrams specific examples of the derivation of the region color adjustment intensity Me'. In each of FIGS. 14A to 14D, the Me ink printing target pixels obtained in S1104 are shown on the left side. The 4×4 pixel region surrounded by the bold lines is a processing region. The hatched pixels are Me ink printing target pixels. Also, the middle diagram in each of FIGS. 14A to 14D is a diagram showing the values to be added to the region color adjustment intensity Me' at pixel positions corresponding to the Me ink printing target pixels in the left diagram. Each value is determined by the processes in S1301 to S1312 in FIG. 13. The right diagram in each of FIGS. 14A to 14D shows the value obtained by adding up the values to be added in the middle diagram, which is the region color adjustment intensity Me' at the processing region.

Figure 14A:
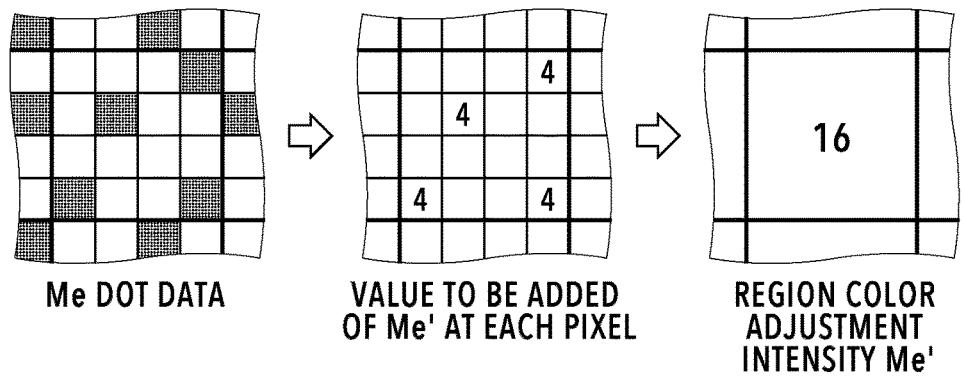
FIGS. 14A to 14D show specific examples of the derivation of the region color adjustment intensity.

FIG. 14A shows an example where four Me ink printing target pixels are present in the processing region. This is an example where none of the printing target pixels has any adjoining printing target pixel. The values to be added to the region color adjustment intensity Me' at the pixel positions of the printing target pixels are all "4", and the region color adjustment intensity Me' as the sum of these values is "16".

Figure 14B:
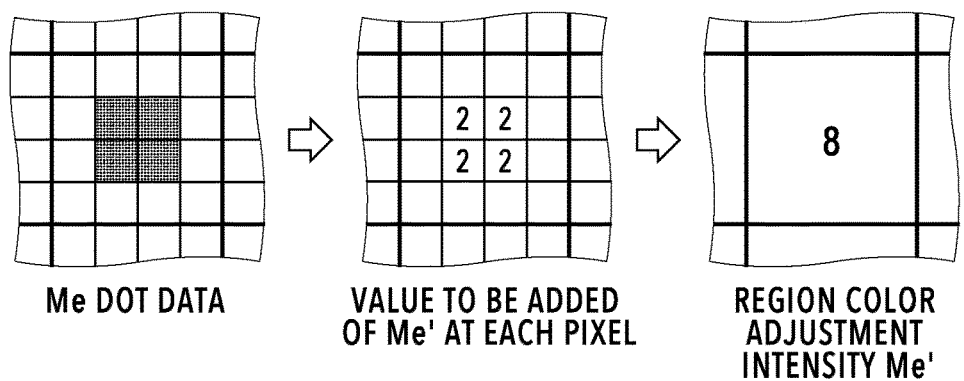

FIG. 14B shows an example where four Me ink printing target pixels are present in the processing region. The printing target pixels are arranged in a 2×2 pixel matrix. The values to be added to the region color adjustment intensity Me' at the pixel positions of the printing target pixels are all "2", and the region color adjustment intensity Me' as the sum of these values is "8".

In a comparison between FIGS. 14A and 14B, the number of printing target pixels (the number of dots) in each 4×4 pixel processing region is the same (four). However, in FIG. 14B, in which the dots are arranged adjacently in a matrix, the coloring is lower, and therefore the value of the region color adjustment intensity Me' is also smaller. The mechanism of how arranging dots adjacently in a matrix reduces the coloring is as mentioned earlier in the explanation of FIG. 7. As described above, in the present embodiment, in the case where the number of dots is the same but the dot arrangement is not, the difference in the degree of the coloring due to the difference in dot arrangement is reflected on the color adjustment ink amount.

Figure 14C:
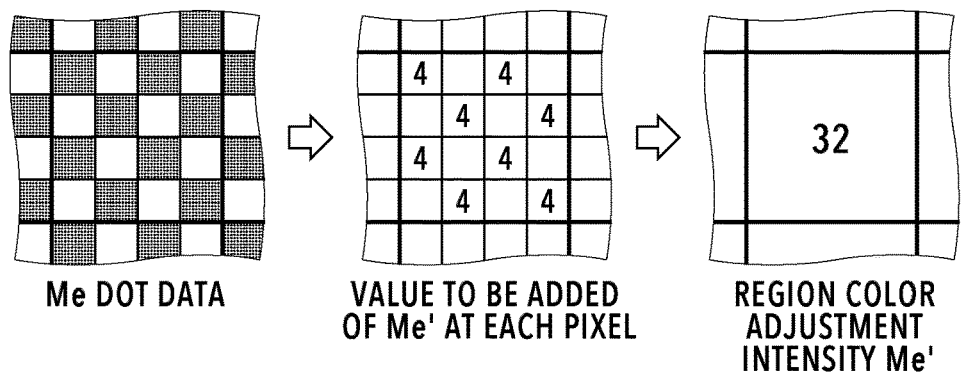

FIG. 14C shows an example where eight Me ink printing target pixels are arranged in a staggered pattern in the processing region. The values to be added to the region color adjustment intensity Me' at the pixel positions of the printing target pixels are all "4", and the region color adjustment intensity Me' as the sum of these values is "32".

In a comparison of FIG. 14C with FIG. 14A, the number of pixels with no Me ink printing target pixel at any of its adjoining pixels has increased from four dots to eight dots. Since the outer periphery of each Me dot is unlikely to overlap the surrounding Me dots, the coloring increases. Accordingly, the value of the region color adjustment intensity Me' is also large.

Figure 14D:
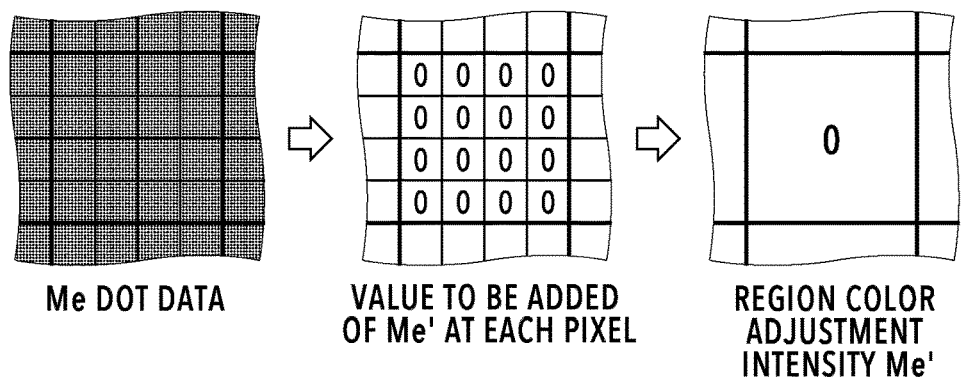

FIG. 14D shows an example where an Me ink printing target pixel is arranged at every pixel in the processing region. The values to be added to the region color adjustment intensity Me' at the pixel positions of the printing target pixels are all "0", and the region color adjustment intensity Me' as the sum of these values is "0". Thus, in the state where a printing target pixel is arranged at every pixel, the degree of the region color adjustment intensity Me' is 0. In this state, the adjacent arrangement of dots in a matrix maximizes the coloring reduction effect, and therefore the region color adjustment intensity Me' is 0.

As described above, by estimating the degree of the coloring from the final dot arrangement of Me ink dots, the color adjustment ink amount is accurately determined.

The examples shown in FIGS. 14A to 14D can be described as below. Me ink printing target pixels include a first pixel (the pixels in FIG. 14A) and a second pixel (the pixels in FIG. 14B) which differ in the number of adjoining other printing target pixels. For the first pixel, the number of adjoining other printing target pixels is "0". For the second pixel, the number of adjoining other printing target pixels is "2". In this case, the degree of the coloring of the Me ink is estimated to be higher at the first pixel, which has a smaller number of adjoining other printing target pixels than the second pixel does, than at the second pixel. In sum, the value of the result of estimation on the degree of the coloring at the first pixel is larger than the value of the result of estimation on the degree of the coloring at the second pixel.

By the end of the process of S1112 described above, a region color adjustment intensity Me' is set for each 4×4 pixel processing region.

Referring back to FIG. 11, the processes in and following S1113 will be described. In S1113, the main control unit 11 determines the color adjustment ink amount at each pixel based on the value of the corresponding region color adjustment intensity Me' derived in S1112. The value of the region color adjustment intensity Me' has been set for each 4×4 pixel processing region as a unit region. The color adjustment ink amount at each pixel in a processing region is determined by the value of the region color adjustment intensity Me' determined for this processing region.

Figure 15:
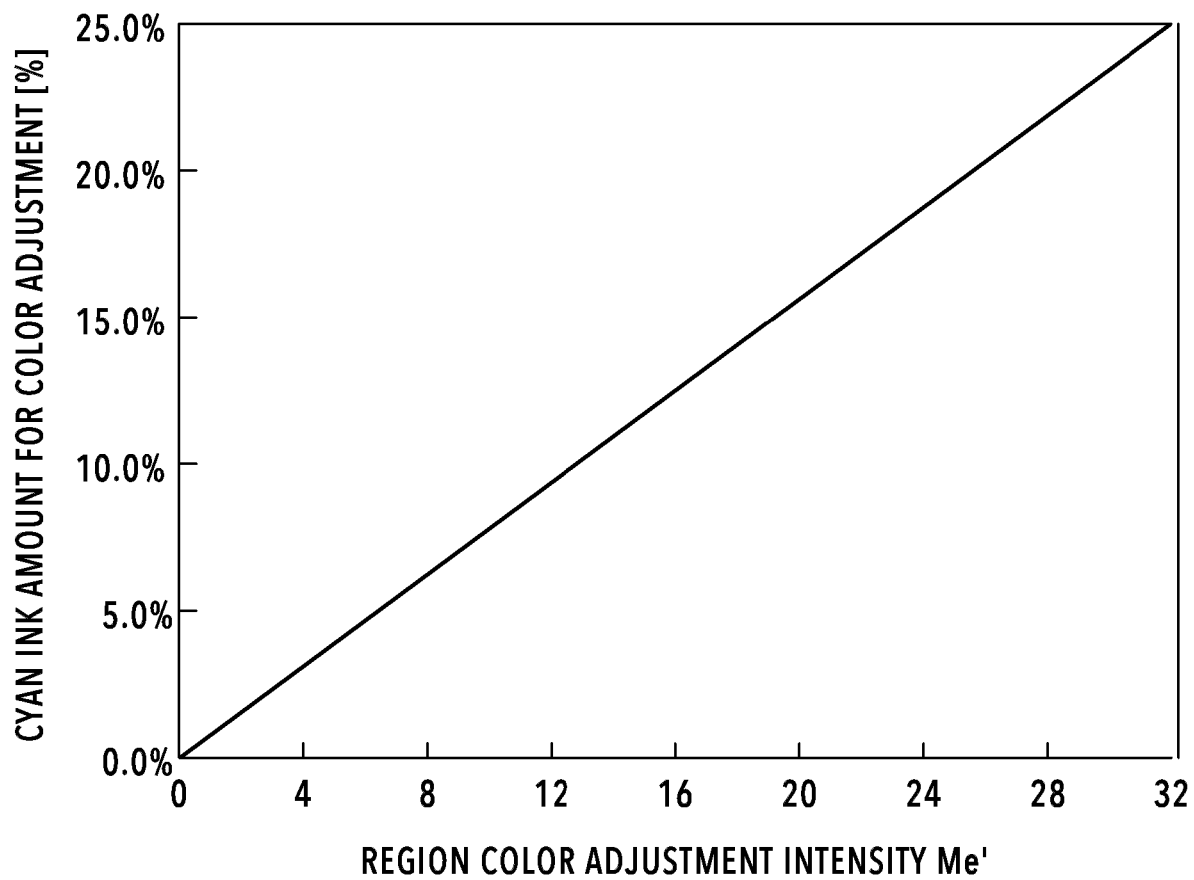
FIG. 15 shows an example of the relationship between the value of the region color adjustment intensity and the color adjustment ink amount.

FIG. 15 shows an example of the relationship between the value of the region color adjustment intensity Me' and the color adjustment ink amount. In the present embodiment, only the cyan ink is used as the color adjustment ink. It is of course possible to further improve the accuracy of the color adjustment by using the inks of the other colors. The horizontal axis represents the region color adjustment intensity Me'. The vertical axis represents the amount of the cyan ink for the color adjustment corresponding to the value of the region color adjustment intensity Me', indicating the average number of dots at 600 dpi with a single cyan ink dot measuring 5.7 ng.

S1124 and S1105 to S1108 are the same processes as S824 and S805 to S808 in FIG. 8, and description thereof is therefore omitted.

As described above, edge and isolated silver ink pixels are detected and the color adjustment ink amounts at these pixels are determined. This enables accurate reduction of the above-described coloring.

Note that while the value of the region color adjustment intensity Me' is determined in the present embodiment by referring the number of Me dots in the four pixels on the upper, lower, left, and right sides, the value of the region color adjustment intensity Me' may be determined based on the number of Me dots in the eight pixels on the upper, lower, left, and right sides and the diagonal corners.

As described above, in the present embodiment, a process is performed which involves estimating the degree of the coloring of each dot in a metallic image based on the final dot arrangement of the dot, and determining the color adjustment ink amount for the dot. This enables reduction of the coloring also at the edges of high-density portions and isolated points.

Third Embodiment

The foregoing embodiments have been described without particularly mentioning a difference by the type of print medium. Note that the degree of the coloring of the Me ink can vary by the type of print medium. In the present embodiment, a description will be given of an example where the degree of superimposition of the Me ink is switched according to the type of print medium. Specifically, a description will be given of a configuration in which a plurality of printing modes is settable which differ from each other in the ratio of the pixels to be printed as superimposed dots among the Me ink printing target pixels.

Referring to FIG. 7 again, the comparison between mat paper and glossy paper shows that the degree of the coloring is higher with the mat paper than with the glossy paper.

Figure 16A:
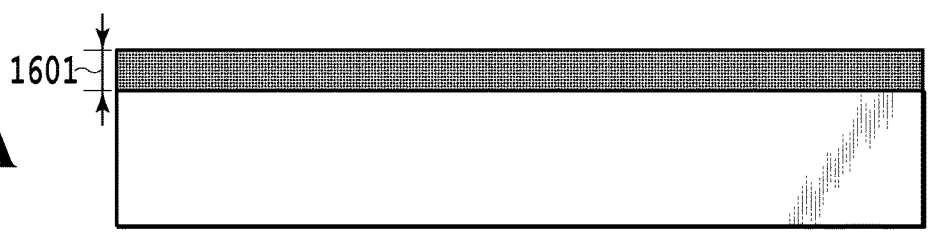
FIGS. 16A to 16F are diagrams explaining that the degree of the coloring varies by the print medium.
Figure 16B:
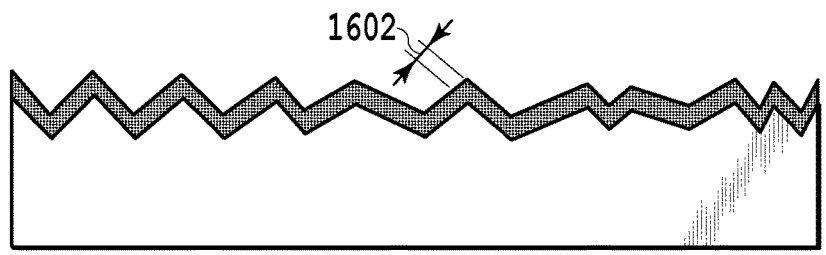

The degree of the coloring varies due to various reasons. For example, a difference in the surface roughness of the print medium causes a difference in the degree of the coloring. The reason for this will be described with reference to FIGS. 16A and 16B. FIG. 16A is a schematic diagram showing a state where a liquid has wetted and spread over a smooth surface. FIG. 16B is a schematic diagram showing a state where the liquid of the same amount as FIG. 16A has wetted and spread over a surface with concavities and convexities. In a comparison between liquid heights 1601 and 1602, the liquid with the height 1602 on the surface with concavities and convexities has a larger surface area and therefore has a smaller thickness on the surface per unit area. In other words, the density of silver particles per unit area is lower and therefore the efficiency of fusion between silver particles is lower on the surface with concavities and convexities than on the smooth surface.

Figure 16C:
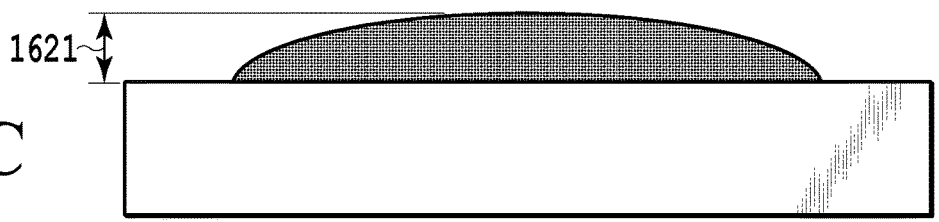
Figure 16D:
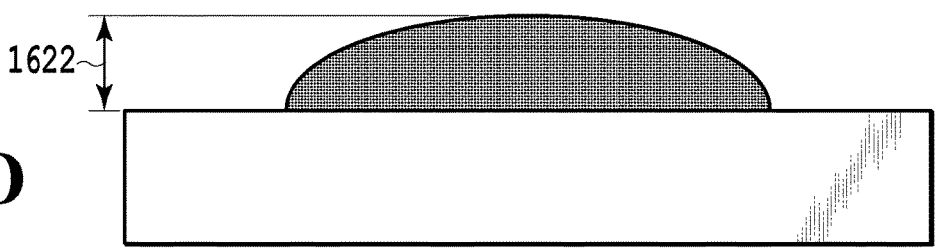

A difference in the surface free energy (surface tension) of the print medium also causes a difference in the degree of the coloring. The reason for this will be described with reference to FIGS. 16C and 16D. FIGS. 16C and 16D are schematic diagrams showing the spread and heights of ink droplets on print medium surfaces differing in surface free energy. FIG. 16C shows a state where the ink spreads more easily since the print medium surface has higher surface tension, while FIG. 16D shows a state where the ink spreads less easily since the print medium surface has lower surface tension. In a case where ink droplets of an identical amount land on the print media in FIGS. 16C and 16D, an ink height 1621 on the surface with higher surface tension is lower than an ink height 1622 on the surface with lower surface tension. In FIG. 16D, in which the dot spreads wider than that in FIG. 16C, as the aqueous medium in the ink droplet permeates the print medium, the density of silver particles per unit area in the dot decreases, so that the efficiency of fusion between silver particles decreases.

Figure 16E:
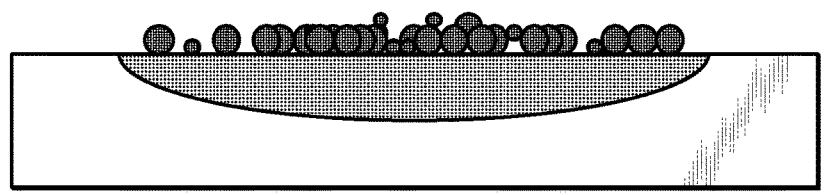
Figure 16F:
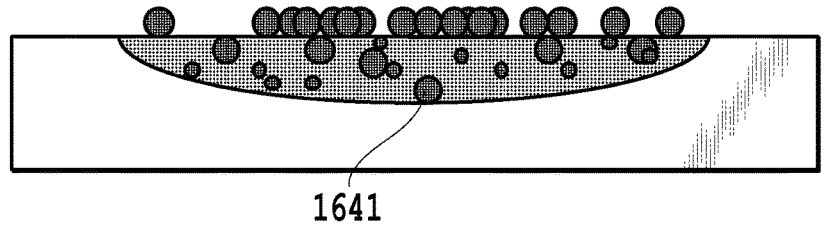

Moreover, a difference in the absolute value or distribution of the particle size of inorganic particles contained in the receiving layer of the print medium also causes a difference in the degree of the coloring. The reason for this will be described with reference to FIGS. 16E and 16F. FIGS. 16E and 16F are schematic diagrams showing the behaviors of silver particles in cases differing in the size of the inorganic particles in the receiving layer. FIG. 16F shows a state 1641 where the size of pores formed by the inorganic particles is larger than that in FIG. 16E, so that some silver particles have permeated the print medium. Since the outsides of the silver particles in the print medium are surrounded by the inorganic particles, their silver fusion hardly occurs. In other words, in the case where the size of the pores formed by the inorganic particle is large as in FIG. 16F, the absolute number of silver particles on the print medium surface is smaller than that in FIG. 16E, and therefore the efficiency of fusion between silver particles is lower.

As described above, with different print media, the degree of the coloring of the Me ink varies due to various factors. In the case where the coloring of the Me ink is cancelled out by a chromatic color ink as described in the first and second embodiments, the color adjustment ink amount is not the same for print media differing in the degree of the coloring. In a case where the color adjustment ink amount is determined for a print medium with which the degree of the coloring is high, the color adjustment will be excessive correction if performed using the same ink amount on a print medium with which the degree of the coloring is low. Conversely, in a case where the color adjustment ink amount is determined for a print medium with which the degree of the coloring is low, the color adjustment will be insufficient correction if performed using the same ink amount on a print medium with which the degree of the coloring is high. Thus, in the present embodiment, the color adjustment ink amount is switched according to the degree of the coloring with the print medium. This enable the coloring to be adjusted appropriately for different print media.

Figure 17:
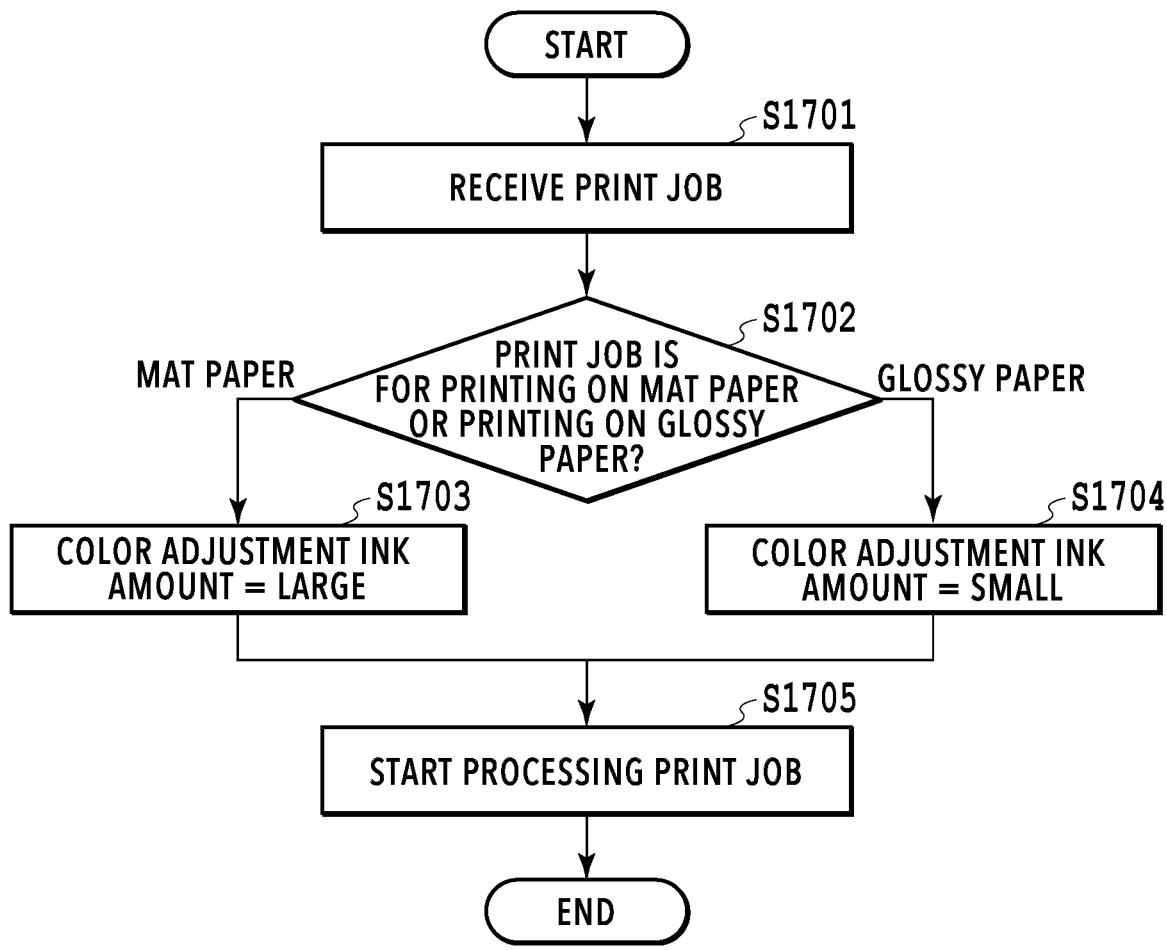
FIG. 17 is a flowchart showing a print data generation process.

A method of switching the printing process to be executed by the main control unit 11 of the printing apparatus 1 in the present embodiment will be described below with reference to FIG. 17. The CPU installed in the main control unit 11 of the printing apparatus 1 deploys a program stored in the ROM into the RAM and executes the deployed program. As a result, each process in FIG. 17 is executed.

In S1701, the main control unit 11 receives a print job supplied from the image processing apparatus 2.

In S1702, the main control unit 11 determines whether the print medium for the job received in S1701 is mat paper or glossy paper. The determination is made by referring to paper setting information set by the user who generated the print job or paper setting information held in the print data buffer 12. The main control unit 11 proceeds to S1703 if the result of the determination indicates mat paper, and proceeds to S1704 if the result of the determination indicates glossy paper.

In S1702, mat paper is taken as an example of a print medium with which the degree of the color is high, and glossy paper is taken as an example of a print medium with which the degree of the coloring is low. Note, however, that the classifications and types of print media for switching the printing process are not limited to these. In an example, the printing process may be switched by different types of glossy paper. Also, in the present embodiment, the determination is based on two types of paper, mat paper and glossy paper. However, the printing process may be switched based on three or more types of paper in a case where each of them differs from the others in the degree of the coloring and requires switching of the printing process.

If the paper setting information in the print job indicates mat paper, then in S1703, the main control unit 11 configures a setting for performing a printing process with a large color adjustment ink amount. On the other hand, if the paper setting information in the print job indicates glossy paper, then in S1704, the main control unit 11 configures a setting for performing a printing process with a small color adjustment ink amount.

Then in S1705, the main control unit 11 executes a printing process differently according to the setting for the printing process with a large color adjustment ink amount or the setting for the printing process with a small color adjustment ink amount. An example of a method of switching the color adjustment ink amount according to the type of the print medium in the present embodiment will be specifically described below.

Figure 18:
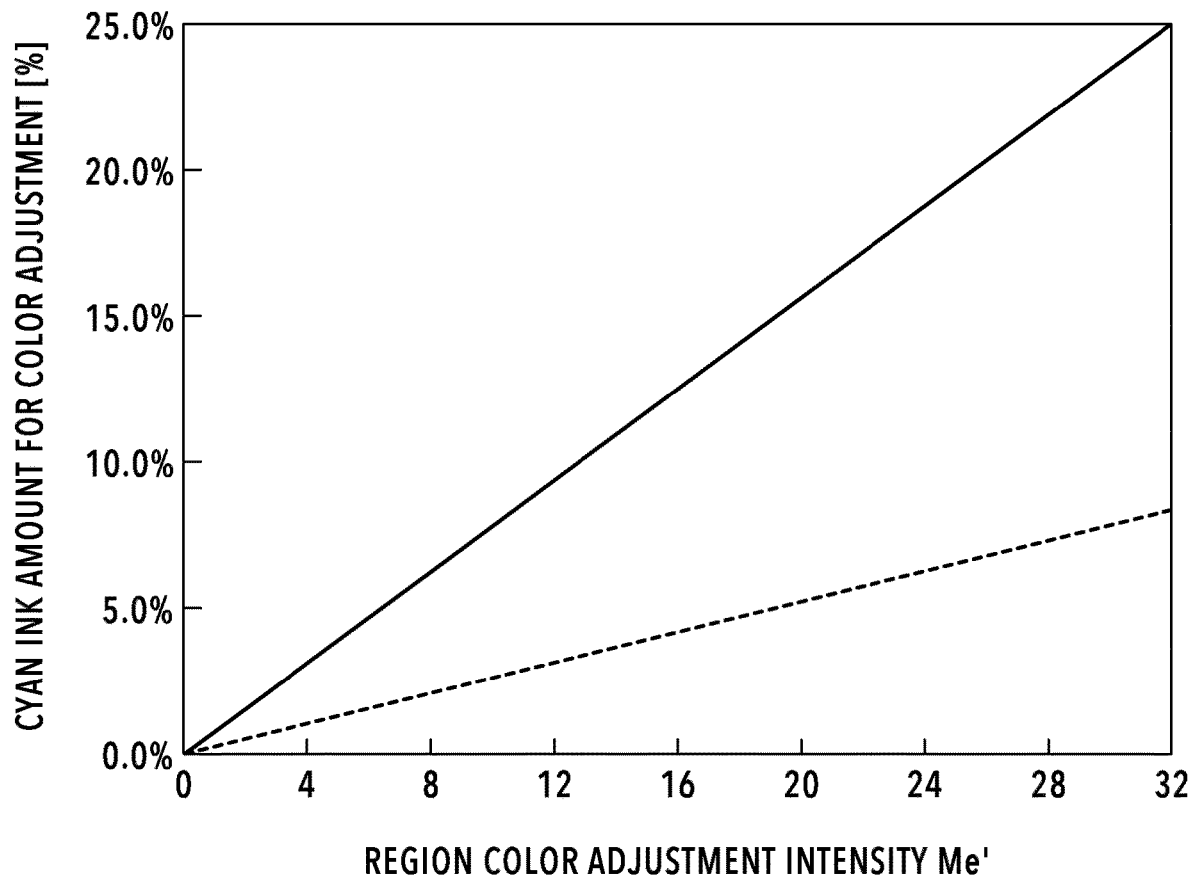
FIG. 18 is a diagram showing examples of the relationship between the value of the region color adjustment intensity and the color adjustment ink amount.

FIG. 18 is a diagram showing an example of the relationship between the value of the region color adjustment intensity Me' and the color adjustment ink amount in S1113 in FIG. 11, and explaining an example of the difference between a case where the degree of the coloring is high and a case where the degree of the coloring is low. The solid line represents the color adjustment ink amounts in the case where the degree of the coloring is high, while the dashed line represents the color adjustment ink amounts in the case where the degree of the coloring is low. FIG. 18 shows that the color adjustment ink amount is smaller in the case where the degree of the coloring is low than in the case where the degree of the coloring is high. Then, a color adjustment ink amount corresponding to the solid line is set in the case where the print medium type is the medium type with which the degree of the coloring is high, and a color adjustment ink amount corresponding to the dashed line is set in the case where the print medium type is the medium type with which the degree of the coloring is low.

In this way, a metallic image can be printed on print media differing in coloring by using respective appropriate color adjustment ink amounts.

In the present embodiment, the color adjustment ink amount is determined from the Me dot arrangement in a predetermined processing region. Note, however, that the color adjustment ink amount can also be determined from the Me ink inputted tone value, as in the first embodiment. In this case, an LUT specifying the cyan ink amounts shown by the long dashed short dashed line in FIG. 10 may be prepared for a plurality of print medium types, and the LUT corresponding to the print medium type to be used for printing may be selected as appropriate and processing may be performed with it. Alternatively, instead of using an LUT, parameters in a function that specify the inputted tone value and the ink amount may be changed as appropriate, for example. Meanwhile, only the cyan ink has been described as an example of the ink to be used for the color adjustment. However, it suffices that the adjustment degree of color adjustment using at least one type of chromatic color ink (the ink amount to be used in the color adjustment) can be controlled.

Other Embodiments

While the main control unit 11 of the printing apparatus 1 executes the processes in the description of the foregoing embodiments, the present invention is not limited to this configuration. Specifically, the main control unit 21 of the image processing apparatus 2 may execute all or some of the processes described in the embodiments. In other words, the image processing including the color separation process may be executed by the printing apparatus 1 or executed by the image processing apparatus 2.

Also, a description has been given by taking as an example a configuration in which inks of three chromatic colors of cyan (C), magenta (M), and yellow (Y) are used as the chromatic color inks. However, the number of chromatic color inks to be used may less than three or more than three.

Also, a description has been given by taking as an example a configuration in which the chromatic color inks are printed in a region where the metallic ink has been printed. However, there may be some regions where only the metallic ink is printed, and some regions where only the chromatic color inks are printed.

Also, a description has been given by taking as an example a configuration in which the print head moves on the print medium and performs printing on the print medium. However, an image may be printed by ejecting ink from the ejection openings while moving the print medium in a direction crossing the direction of the ejection openings arrangement using a print head in which the ejection openings are arranged over the length of the width of the print medium.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-077284, filed Apr. 15, 2019, which is hereby incorporated by reference wherein in its entirety.

What is claimed is:

1. An image processing apparatus comprising:
a generation unit configured to generate print data to be used in printing a metallic image using a metallic ink containing silver particles in an inkjet printing apparatus capable of ejecting the metallic ink and at least one type of chromatic color ink; and
an obtaining unit configured to obtain metallic image data corresponding to a predetermined region on a print medium and indicating a tone in the metallic image,
wherein the generation unit generates print data of the metallic ink to be printed in the predetermined region based on the metallic image data obtained by the obtaining unit and generates print data of the chromatic color ink to be printed in the predetermined region based on the metallic image data obtained by the obtaining unit and pre-stored data indicating correspondences between tone values of the metallic image data and amounts of the chromatic color ink.

2. The image processing apparatus according to claim 1, wherein the chromatic color ink is an ink of a color that reduces visibility of coloring appearing at an outer periphery of a metallic dot of the metallic ink.

3. The image processing apparatus according to claim 2, wherein the generation unit generates the print data of the chromatic color ink such that a hue is within ±60 degrees from a direction opposite from a hue of a color of the coloring appearing at the outer periphery of the metallic dot, and a saturation is less than two times a saturation of the color of the coloring.

4. The image processing apparatus according to claim 1, the apparatus further comprising a storing unit configured to store the pre-stored data indicating correspondences between tone values of the metallic image data and amounts of the chromatic color ink.

5. The image processing apparatus according to claim 1, wherein the generation unit performs a first color separation process of performing color separation on the metallic image data obtained by the obtaining unit into image data of a color of each chromatic color ink, and generates the print data of the chromatic color ink by using first image data obtained by the first color separation process.

6. The image processing apparatus according to claim 5, wherein
the obtaining unit further obtains color image data indicating a tone in a color image to be printed with the chromatic color inks, and
the generation unit performs a second color separation process of performing color separation on the color image data into image data of the color of each chromatic color ink, and generates the print data of the chromatic color ink by using the first image data and second image data obtained by the second color separation process.

7. The image processing apparatus according to claim 6, wherein the generation unit calculates a sum of a pixel value of each pixel in the second image data and a pixel value of a corresponding pixel in the first image data, and generates the print data of the chromatic color ink by using image data in which each pixel has the sum.

8. The image processing apparatus according to claim 7, wherein the generation unit generates the print data of the chromatic color ink by quantizing the image data in which each pixel has the sum.

9. The image processing apparatus according to claim 5, wherein the generation unit determines a pixel value of each pixel in the first image data based on a tone value of a corresponding pixel in the metallic image data.

10. The image processing apparatus according to claim 9, wherein in a case where a tone value of a pixel in the first image data generated by the generation unit has a maximum value, the tone value of a pixel in the metallic image data corresponding to the pixel in the first image data is smaller than a maximum pixel value.

11. The image processing apparatus according to claim 5, wherein for each of unit regions in the metallic image data, the generation unit determines a pixel value of each pixel in the first image data corresponding to the unit region.

12. The image processing apparatus according to claim 11, wherein the generation unit determines an adjustment degree of the chromatic color ink for each of the unit regions in the metallic image data, and determines the pixel value of each pixel in the first image data such that the higher the determined adjustment degree, the higher the corresponding pixel value in the first image data.

13. The image processing apparatus according to claim 12, wherein each of the pixels forming the unit regions in the metallic image data is a printing target pixel in which a metallic dot is to be arranged or a pixel in which a metallic dot is not to be arranged.

14. The image processing apparatus according to claim 13, wherein the generation unit determines the adjustment degree of the chromatic color ink for each of the unit regions based on the number of other printing target pixels adjoining a printing target pixel in the unit region.

15. The image processing apparatus according to claim 14, wherein the generation unit
derives a higher adjustment degree for a first pixel among printing target pixels in each of the unit regions than the adjustment degree for a second pixel in the unit region, the first pixel having a smaller number of adjoining other printing target pixels than the second pixel does, and
determines a value obtained by adding up the adjustment degrees derived for the printing target pixels in the unit region as the adjustment degree for the unit region.

16. The image processing apparatus according to claim 14, wherein the adjoining other printing target pixels are four pixels arranged on upper, lower, left, and right sides of the printing target pixel.

17. The image processing apparatus according to claim 5, further comprising
a setting unit capable of setting a printing mode among a plurality of printing modes according to a type of a print medium onto which to eject the metallic ink, the plurality of printing modes including: a first printing mode in which a pixel value of a predetermined pixel in the first image data obtained from predetermined metallic image data is set at a first value; and a second printing mode in which the pixel value of the predetermined pixel is set at a second value smaller than the first value,
wherein the generation unit generates the print data of the metallic ink and the print data of the chromatic color ink based on the printing mode set by the setting unit and the metallic image data obtained by the obtaining unit.

18. The image processing apparatus according to claim 17, wherein the setting unit sets the first printing mode in a case of using such a print medium that density of silver particles in a single metallic dot formed on a surface of the print medium by ejecting the metallic ink onto the print medium is a first density, and sets the second printing mode in a case of using such a print medium that density of silver particles in a single metallic dot formed on a surface of the print medium is a second density higher than the first density.

19. An image processing method, comprising:
generating print data to be used in printing a metallic image using a metallic ink containing silver particles in an inkjet printing apparatus capable of ejecting the metallic ink and at least one type of chromatic color ink; and
obtaining metallic image data corresponding to a predetermined region on a print medium and indicating a tone in the metallic image,
wherein the generating includes generating print data of the metallic ink to be printed in the predetermined region based on the metallic image data obtained in the obtaining and generating print data of the chromatic color ink to be printed in the predetermined region based on the metallic image data obtained in the obtaining and pre-stored data indicating correspondences between tone values of the metallic image data and amounts of the chromatic color ink.

20. A non-transitory computer readable storage medium storing a program which causes a computer to perform an image processing method, the image processing method comprising:

generating print data to be used in printing a metallic image using a metallic ink containing silver particles in an inkjet printing apparatus capable of ejecting the metallic ink and at least one type of chromatic color ink; and obtaining metallic image data corresponding to a predetermined region on a print medium and indicating a tone in the metallic image, wherein the generating includes generating print data of the metallic ink to be printed in the predetermined region based on the metallic image data obtained in the obtaining and generating print data of the chromatic color ink to be printed in the predetermined region based on the metallic image data obtained in the obtaining and pre-stored data indicating correspondences between tone values of the metallic image data and amounts of the chromatic color ink.

* * * * *